United States Patent
Kirchner

(10) Patent No.: US 7,326,044 B2
(45) Date of Patent: Feb. 5, 2008

(54) RAPID THERMOFORM PRESSURE FORMING PROCESS AND APPARATUS

(75) Inventor: Grant David Kirchner, North Vancouver (CA)

(73) Assignee: Ortho-Active Holdings Inc., Coquitlam, BC (CA)

( * ) Notice: Subject to any disclaimer, the term of this patent is extended or adjusted under 35 U.S.C. 154(b) by 522 days.

(21) Appl. No.: 10/429,035

(22) Filed: May 5, 2003

(65) Prior Publication Data

US 2004/0222562 A1 Nov. 11, 2004

(51) Int. Cl.
B29C 51/10 (2006.01)
B29C 51/28 (2006.01)

(52) U.S. Cl. ............... 425/387.1; 264/257; 264/314; 264/324; 425/388; 425/389

(58) Field of Classification Search ............... 425/388, 425/389, 390, 405.1, 387.1; 264/257, 258, 264/313, 314, 316, 324, 571
See application file for complete search history.

(56) References Cited

U.S. PATENT DOCUMENTS

| | | | |
|---|---|---|---|
| 2,565,949 A | 8/1951 | Clifford et al. | |
| 3,146,143 A | 8/1964 | Bolesky et al. | |
| 3,414,456 A | 12/1968 | Roberts | 161/7 |
| 3,655,861 A | 4/1972 | Roberts | 264/250 |
| 3,949,125 A | 4/1976 | Roberts | 428/99 |
| 4,034,054 A | 7/1977 | Sauer | |
| 4,267,142 A | 5/1981 | Lankheet | 264/510 |
| 4,555,380 A | 11/1985 | Munakata et al. | |
| 4,576,776 A | 3/1986 | Anderson | 264/510 |
| 4,716,067 A | 12/1987 | Moji et al. | 428/117 |
| 5,000,809 A | 3/1991 | Adesko et al. | 156/230 |
| 5,217,555 A | 6/1993 | Franklin, III et al. | 156/156 |
| 5,529,826 A | 6/1996 | Tailor et al. | 428/110 |
| 5,725,704 A | 3/1998 | Gallagher et al. | 156/66 |
| 5,928,597 A | 7/1999 | Van Ert | 264/316 |
| 6,197,412 B1 | 3/2001 | Jambois | 428/297.4 |
| 6,436,540 B1 | 8/2002 | Garcia et al. | 428/423.1 |
| 2002/0012765 A1 | 1/2002 | Debalme et al. | 428/98 |
| 2002/0160205 A1 | 10/2002 | Garcia et al. | 428/423.1 |

FOREIGN PATENT DOCUMENTS

| | | |
|---|---|---|
| EP | 0 328 698 A | 8/1989 |
| GB | 1 138 391 A | 1/1969 |
| GB | 2 267 457 A | 12/1993 |

*Primary Examiner*—Mathieu D. Vargot
(74) *Attorney, Agent, or Firm*—Oyen Wiggs Green & Mutala LLP

(57) ABSTRACT

This invention relates to a novel apparatus and process for producing thermoplastic articles. In one aspect, the invention pertains to a process for manufacturing fiberglass products using a fiberglass material consisting of fiberglass strands commingled with heat-formable polypropylene strands. A molding apparatus comprising: (a) an air pressure chamber with an open side; (b) a flange plate fitted to the open side of the air pressure chamber, said flange plate having an opening therein for receiving a mold; (c) an upper bladder associated with the flange plate and covering the opening; (d) a base pressure plate; (e) a mold positioned on the base pressure plate; and (f) a locking mechanism for securing the air pressure chamber with the base pressure plate, and balanced air pressure in each chamber during molding.

11 Claims, 27 Drawing Sheets

RAPID THERMOFORM PRESSURE FORMING PROCESS AND APPARATUS

FIELD OF THE INVENTION

This invention relates to a novel apparatus and process for producing thermoplastic articles. In one aspect, the invention pertains to a process for manufacturing fiberglass products using a fiberglass material consisting of fiberglass strands commingled with heat-formable polypropylene strands.

BACKGROUND OF THE INVENTION

There are many existing processes for forming thermoplastic (thermoforming) articles including vacuum molding, injection molding, extrusion molding and the like. A perennial problem with many existing thermoforming processes, particularly, when dealing with large thermoformed materials and continuous fiber reinforcements, is that voids appear between the thermoformed material and the mold. Another problem that occurs when there are recessed areas in the mold is resin pooling in the recessed areas when dealing with pre-consolidated thermo-compositess. A further problem is that folds and pleats in the thermoformed product occur at the corners and other areas of the thermoformed product when complex and deep concave or convex articles are formed.

Fiber composite materials that require heating and then a molding force in the form of either vacuum or positive pressure are commonly referred to as pre-consolidated thermoformed fiber composites. Most of the pre-impregnated materials used in conjunction with fabricating techniques using an autoclave are generally classified as thermoformed fiber composite materials. Products made with pre-impregnated materials using autoclave technology are very strong and lightweight. However, the materials, tooling and equipment required to make parts using pre-impregnated materials are very expensive. The heating, forming and cooling cycle times are very long as well.

Twintex™ is a drape molded thermoformable product manufactured by St. Gobain-Vetrotex Corp. The product is fully described in a manual entitled "Twintex Vacuum Moulding Manual", the contents of which are incorporated herein by reference. It is in the form of a commingled glass fibre-polypropylene fibre composite woven cloth that is very similar in appearance to the conventional fiberglass woven cloth that is used in combination with liquid resins (polyesters, acrylics or epoxies) to fabricate a wide variety of products such as boats, automotive body panels and housing construction materials. The material is drape molded on the mold prior to heating and then consolidated using vacuum or pressure. However, unlike conventional fiberglass products that require the saturation of the fibers with a liquid resin such as a polyester, an acrylic or a two part epoxy (commonly referred to as thermo-set fiber composites), the Twintex material requires heating to 400 degrees Fahrenheit and then either pressure or vacuum forming the part for the duration of the cooling cycle. The difference between Twintex and a pre-impregnated composite is that the glass fibers in Twintex are "commingled" with heat formable polypropylene fibers, whereas the fibers in a pre-impregnated material (typically Kevlar™ or carbon graphite) are either "pre-coated" or pre-formed in a flat sheet with a heat-formable version of an epoxy or an acrylic resin. The Twintex material is typically much easier to handle and apply, has much shorter heating and molding cycle times, requires less pressure for molding and costs far less per pound than pre-impregnated materials.

The Twintex material on a strength to weight ratio, and on a price per pound ratio outperforms products consisting of far more expensive thermo-set material combinations such as Kevlar/epoxy resin laminations in the areas of strength, impact resistance and abrasion resistance. The cycle times for heating, pressure forming and cooling parts made of the Twintex material or other thermoformable material can also be substantially shorter than the cycle times required to saturate and cure fiberglass parts made using liquid resins.

There are many methods of producing tooling and parts made with Twintex material. However, all of the methods involve either expensive tooling and equipment, long heating and cooling cycle times, or a combination of the two.

The inventor herein is aware of the following patents which may be considered relevant to the subject invention.

US 2002/0,012,765 A1
U.S. Pat. No. 3,949,125
U.S. Pat. No. 3,414,456
U.S. Pat. No. 5,655,861
U.S. Pat. No. 5,529,826
U.S. Pat. No. 4,267,142
U.S. Pat. No. 4,576,776
U.S. Pat. No. 4,716,067
U.S. Pat. No. 5,217,555
U.S. Pat. No. 5,725,704
U.S. Pat. No. 5,928,597

SUMMARY OF THE INVENTION

This invention enables thermoformed products, drape molded thermoconsolidated or thermoset products to be formed at accelerated conditions and exceptional deep draws. The invention utilizes balanced loads which permit large forces to be used with simple molds.

The invention in a first embodiment is directed to a molding apparatus comprising: (a) an air pressure chamber with an open side; (b) a flange plate fitted to the open side of the air pressure chamber, said flange plate having an opening therein for receiving a mold; (c) an upper bladder associated with the flange plate and covering the opening; (d) a base pressure plate; (e) a mold positioned on the base pressure plate; and (f) a locking mechanism for securing the air pressure chamber with the base pressure plate.

The apparatus can include a second bladder positioned over the mold on the base pressure plate and a retaining frame which can hold the second bladder in place over the mold The air pressure chamber can be pivotally connected with the base pressure plate. The mold can be formed of sections which are joined together.

The apparatus can include an outlet for evacuating air from between the second lower bladder and the base pressure plate and an inlet for enabling air to be introduced into the air pressure chamber to force the upper bladder against a thermoformable fibre reinforced composite material positioned on the lower bladder over the mold.

The apparatus can include one or two retaining frame(s), the first of which provides a vacuum and pressure chamber and the second of which provides a vacuum chamber over porous material These can hold a second bladder, the first bladder and the flange on the first air pressure chamber.

The invention is also directed to an air pressure molding apparatus comprising: (a) a first air pressure chamber having an opening therein; (b) a second air pressure chamber having an opening therein associated with the first air pressure chamber; (c) a first bladder associated with the opening of the first air pressure chamber; (d) a flange with an opening therein for receiving a mold; (e) a mold which fits on the flange; (f) a second bladder which fits over the mold and the flange; and (g) a third bladder associated with the opening of the second air pressure chamber.

The apparatus includes flexible tubes for introducing air into or evacuating air from one or both of the first air pressure chamber and the second air pressure chamber and from the space between the first and second bladders.

The apparatus is used to mold a drape molded, thermo-consolidated fibre reinforced composite placed over the second bladder fitted over the mold. The apparatus can include a heat source for heating the thermoformable fibre reinforced composite.

The first air pressure chamber and the second air pressure chamber can be pivotally connected with one another and the first air pressure chamber and the second air pressure chamber can be closed and locked together. The apparatus can include a cylinder which can pivotally close the first air pressure chamber and the second air pressure chamber together. A second air cylinder is used to engage a locking device used to hold the two cylinders together when air pressure is applied to the two chambers.

The apparatus can include a concave shaped mold for enabling concave shaped thermoformable fibre reinforced composites or other thermoplastics to be formed. The apparatus can include a convex shaped mold for enabling convex shaped thermoformable fibre reinforced composites or other thermoplastics to be formed.

A fastener retaining device can be positioned between a first and a second thermoformable fibre reinforced composite and the first and second composite can be heated and pressed together by the air pressure chamber over the mold.

The invention is also directed to a molding process comprising: (a) placing a thermoformable material on a mold positioned on a base pressure plate; (b) heating the thermoformable material; and (c) pressuring the thermoformable material onto the mold utilizing a bladder on an air pressure chamber.

The air pressure chamber can be pivotally connected with the base pressure plate. The process can include a second bladder positioned over the mold on the base pressure plate. Air can be evacuated from the space between the second bladder and the base pressure plate.

The process can include a mechanism for enabling air to be introduced into the air pressure chamber to force the bladder against the thermoformable fibre reinforced composite material or other thermoplastic material positioned on the mold. The process can also include a mechanism for enabling air to be introduced into the air pressure chamber to force the bladder against the thermoformable fibre reinforced composite material or other thermoplastic positioned on the mold.

The invention is also directed to a molding process comprising: (a) a first air pressure chamber; (b) a first bladder associated with the first air pressure chamber; (c) a flange with an opening therein for receiving a mold; (d) a mold which fits on the flange; (e) a second bladder which fits over the mold and the flange; (f) a second air pressure chamber; (g) a second flange associated with the second air pressure chamber, and having an opening therein for enabling the flange to fit over the mold; (h) a third bladder associated with the second flange and the second air pressure chamber; and (i) a thermoformable material, said first second and third bladders being operated to force the thermoformable material to conform with the shape of the mold.

Air can be introduced into or evacuated from one or both of the first air pressure chamber and the second air pressure chamber and from the space between the first and second bladders to cause the thermoformable material to conform with the shape of the mold. The thermoformed material can be a reinforced composite or thermoplastic which can be placed over the second bladder over the mold. The process can include a heat source for heating the thermoformable fibre reinforced composite.

The first air pressure chamber and the second air pressure chamber can be pivotally connected with one another and the first air pressure chamber and the second air pressure chamber can be closed and locked together.

The invention is also directed to a method of fabricating thermoplastic or thermo-composite parts made with (1) rapid fabricated molds using inexpensive porous mold materials; (2) rapid heating, molding and cooling of the molded parts; (3) in the case of a commingled thermo-composite product such as Twintex, rapid heating consolidation and cooling of the parts; and (4) separate heating cycles for different layers of lamination prior to consolidation in the mold apparatus. This allows for a wide variety of surface finishes and structural reinforcements to be incorporated into a part prior to molding or consolidation. Balanced loading of medium to large size molds made of inexpensive porous mold materials (MDF) is thus possible. Accurately positioned embedded fasteners can be located within the composite layup to produce a fastener of superior strength and accuracy of placement.

A method of making a knee brace or other non-invasive orthopedic product using commingled product and stretchable cosmetic material compatible with the commingled product, and clear polypropylene film, heated separately and then consolidated and cooled together. This produces a strong durable product with an attractive outer coating.

BRIEF DESCRIPTION OF DRAWINGS

In drawings which illustrate specific embodiments of the invention, but which should not be construed as restricting the spirit or scope of the invention in any way.

DETAILED DESCRIPTION OF THE INVENTION

Figure 1:
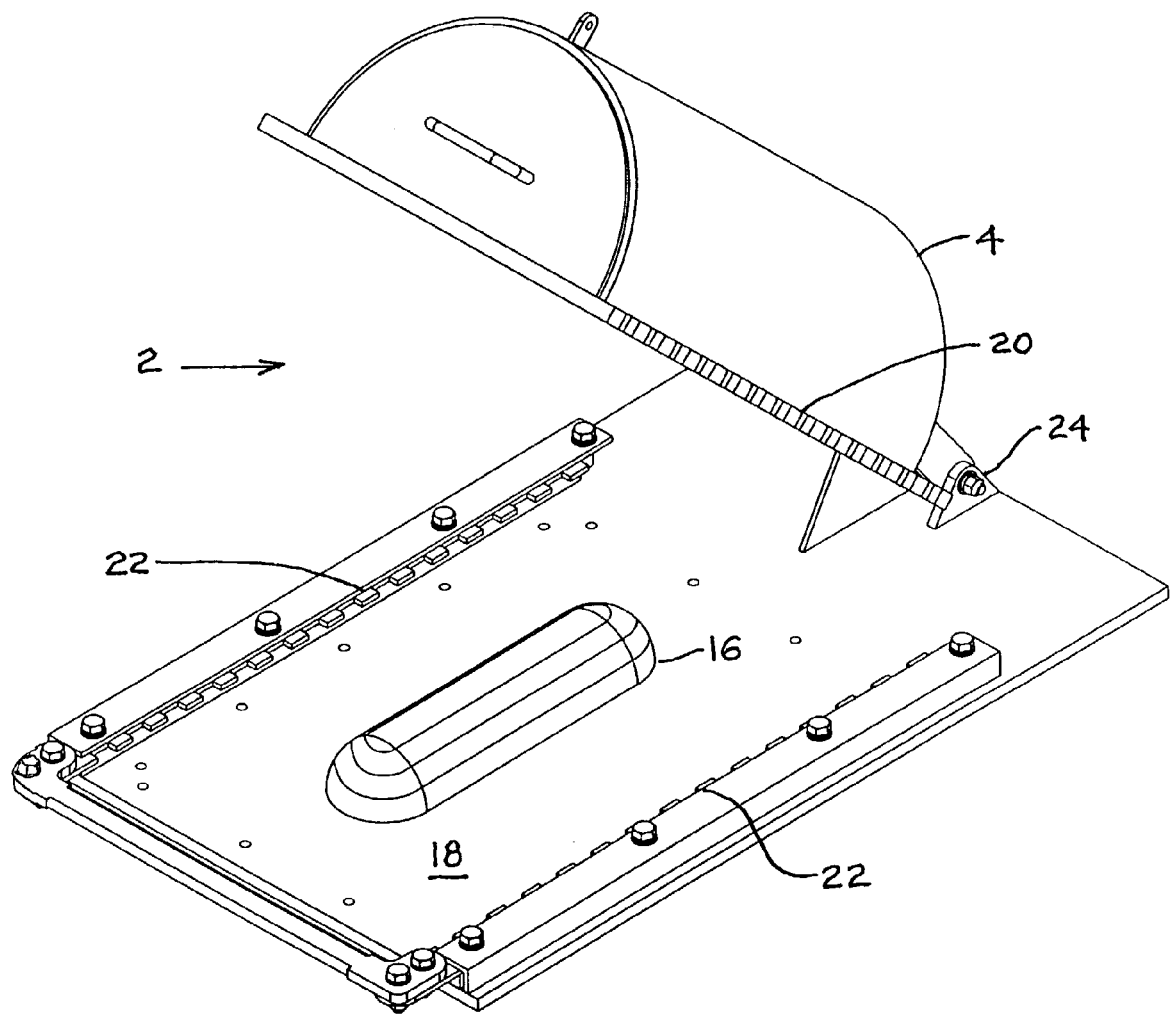
FIG. 1 is an isometric view of the air pressure molding apparatus with an air pressure chamber pivotally mounted on a pressure base plate and lock down mechanism with a mold positioned on the plate between the lock down mechanisms on either side of the base plate.

The manufacturing process according to the invention provides a method for producing parts using very inexpensive tooling and very short cycle times for heating, pressurizing and cooling parts made of Twintex or other materials, such as thermoformable plastics, and continuous or chopped fibre thermo-composite materials.

In this description, the following terms apply:

Thermoformable Plastic: A non-reinforced plastic such as polyethylene, polypropylene or ABS.

Thermoset Plastic: A liquid plastic which undergoes a chemical reaction and sets upon heating. It is usually reinforced with continuous or chopped strands or fibres.

Chopped Strand (Fibre): A fibre such as fibreglass which is cut to specific lengths.

Continuous Strand (Fibre): A fibre which is elongated and typically runs the length of the molded resin article.

Long Fibre Thermoformed Plastic Product: A pre-consolidated thermo-composite material, typically in a flat sheet form, consisting of long fibers configured in different orientations, bound together by either a thermoset, or thermoformed resin.

Commingled Strand Thermo-composite: A mixture of fiber reinforcing strands commingled or mixed with thermoplastic strands in specific volumetric ratios and comes in either rovings or woven fabric forms.

The subject invention has three main aspects:
1. The pressure forming technique and descriptions of the machinery built for the subject process provides a method to rapidly heat, pressurize and cool parts made of the Twintex material. The technique involves special tooling fixtures that will be described in more detail below. Those techniques ensure accurate placements of the Twintex material on the mold and results in an accurately controlled amount of flash or material to be trimmed from the molded article. In turn, material waste is minimized and the tooling involved also provides a method to accurately trim the parts, leaving a rounded edge.
2. The method of layering the Twintex product with stretch Lycra products made with fiber materials that are compatible with this process, and a thin, clear polypropylene sheet material using negative and positive molds. This method provides the ability to quickly produce a very strong and very light pressure formed fiberglass part with an excellent cosmetic finish. Using this method, fiberglass parts can also be designed and fabricated to produce superior performance characteristics such as zones with different flexibility and rigidity areas within the same part.
3. The method according to the invention also provides a technique for the accurate placement of metal fasteners that are entirely encased or embedded in the Twintex material after pressure forming. This method produces a very strong fiberglass part/metal fastener interface that is highly resistant to material failure at the high stress areas that are typically encountered at the part/fastener point of attachment. The embedded fasteners can also be post machined after the pressure forming process is complete.

This method and apparatus for forming fiberglass parts using the Twintex material and the pressure forming techniques according to the invention provides the following advantages:
1. Voids between the Twintex material and the mold, or voids within the separate layers of Twintex material, are eliminated or minimized.
2. The pooling of liquid resin (thermo-set resins) that normally occurs in recessed areas on the mold using standard thermoset and vacuum bagging techniques, or tooling fissures that result in areas in the part that are not reinforced with fiber material, are eliminated by using the Twintex material in combination with the pressure forming processes according to the invention. This allows for tighter molding of fibers around sharp corners on a mold, resulting in a stronger part with much sharper line definition transferred from the shape of the mold to the shape of the part. The molded parts are also stronger and lighter without either the voids or the un-reinforced areas of pooled resin. Much better flow of the resin is obtained. The curves of the fibre more accurately conform with the shape of the mold.
3. Cycle times for thermoset resin and strand products are typically 4 hours to 2 days. Cycle times for commingled strand products using thermoformed resins are typically 20 to 30 minutes.

General Description of Specific Embodiments of Apparatus

This description will now discuss specific embodiments of the invention which are illustrated in the drawings.

FIG. 1 represents an isometric view of an air pressure molding apparatus 2 with a single air pressure chamber 4 pivotally mounted on a pressure base plate 18 and lock down mechanism 20, 22 with a mold 16 positioned on the plate 18 between the lock down mechanisms 20, 22 on either side of the base plate 18. The chamber 4 which is in the form of a hollow half-cylinder is pivotally connected to the base plate 18 by a hinge 24.

Figure 2:
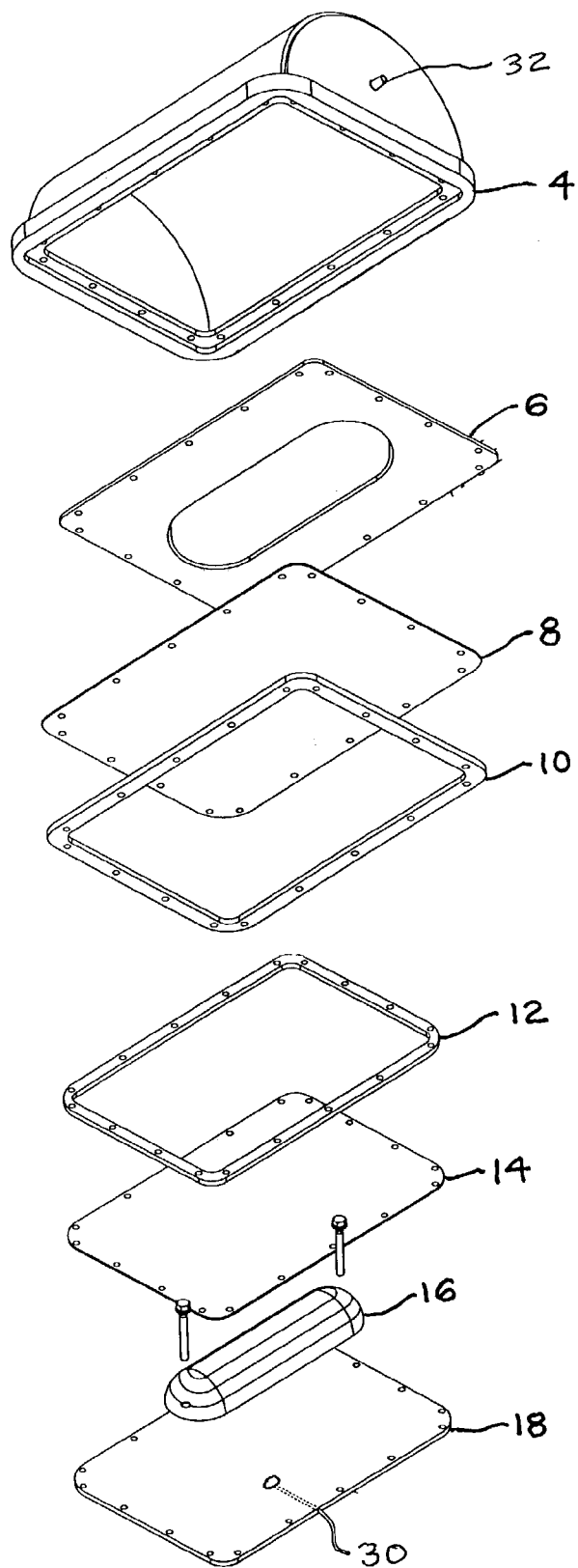
FIG. 2 is an exploded isometric view of the components of the air pressure molding apparatus.

FIG. 2 is an exploded isometric view of the components of the air pressure molding apparatus including the single air pressure chamber 4, upper flange plate 6, upper bladder 8, upper bladder frame 10, lower bladder frame 12, lower bladder 14, mold 16 and pressure base plate 18. The upper bladder frame 10 holds the upper bladder 8 and upper flange plate 6 to the underside of the air pressure chamber 4. The lower frame 12 holds the lower bladder 14 over the mold 16 on the pressure base plate 18. The air inlet/outlet 30 is connected to the base plate 18. An air inlet/outlet 32 is connected to chamber 4.

Figure 3:
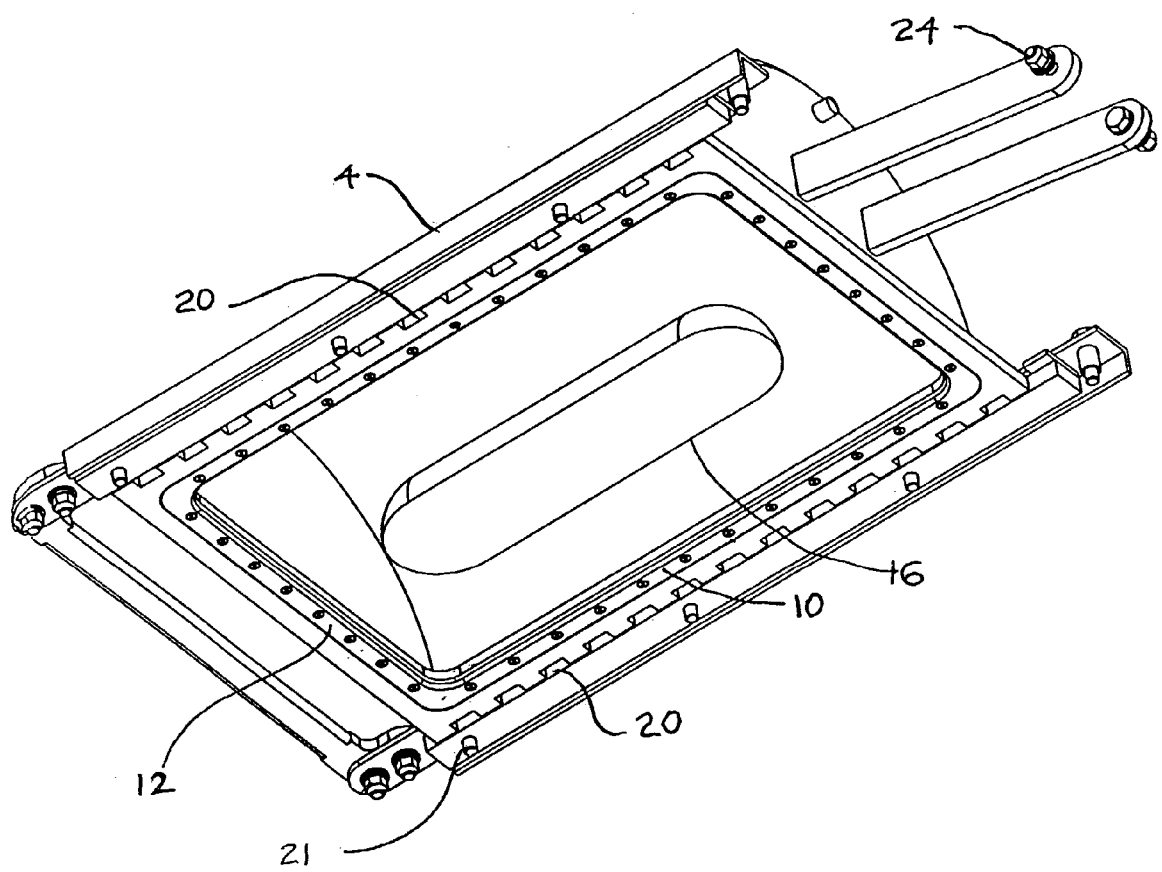
FIG. 3 is an isometric underside view of the upper air pressure chamber.

FIG. 3 is an isometric underside partial cutaway view of the single air pressure chamber 4 and frame 12 mounting assembly, upper lock down teeth 20 and hinge 24. The mold 16 is shown in suspension. The two bladders, flange and base plate are not shown. The attachment bolts 21 fasten the lock down mechanism to the plate 18.

Figure 4:
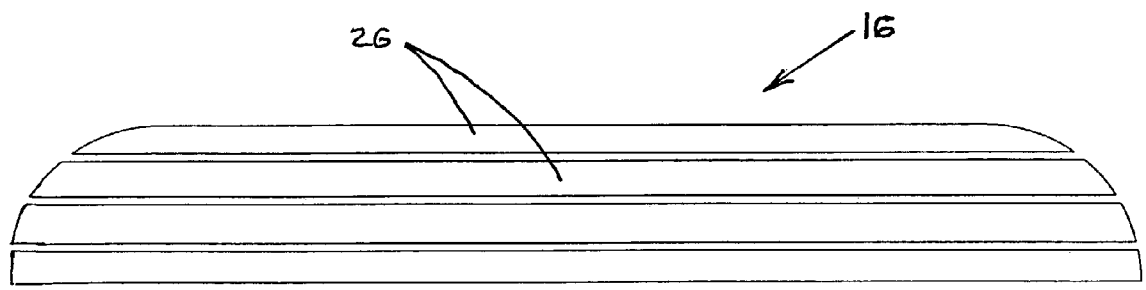
FIG. 4 is an exploded side elevation view of the mold components.

FIG. 4 is an exploded side view of the component layers 26 of a mold 16. The mold must be of a porous material to allow drawing the bladder tightly on the surface of the mold via a vacuum. The laminated construction enables numerous styles of mold shapes and sizes to be quickly fabricated. It is understood that it is only one of numerous types of molds that can be used with this invention.

Figure 5:
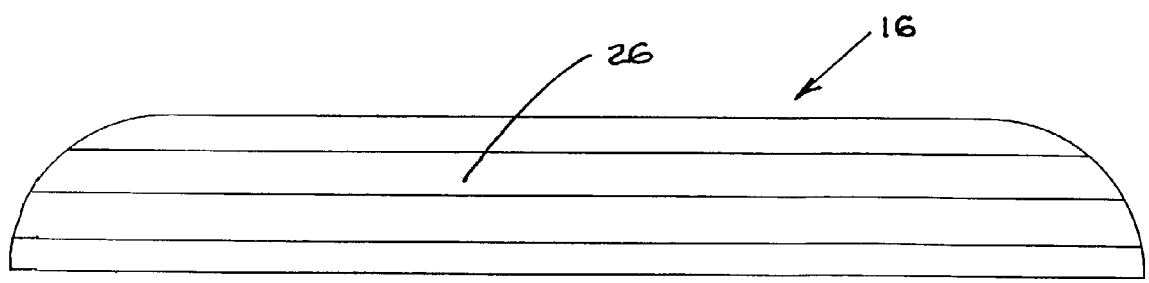
FIG. 5 is a side elevation view of the assembled mold components.

FIG. 5 is a side view of the assembled mold components. The laminated layers 26 allow rapid assembly using inexpensive materials.

Figure 6:
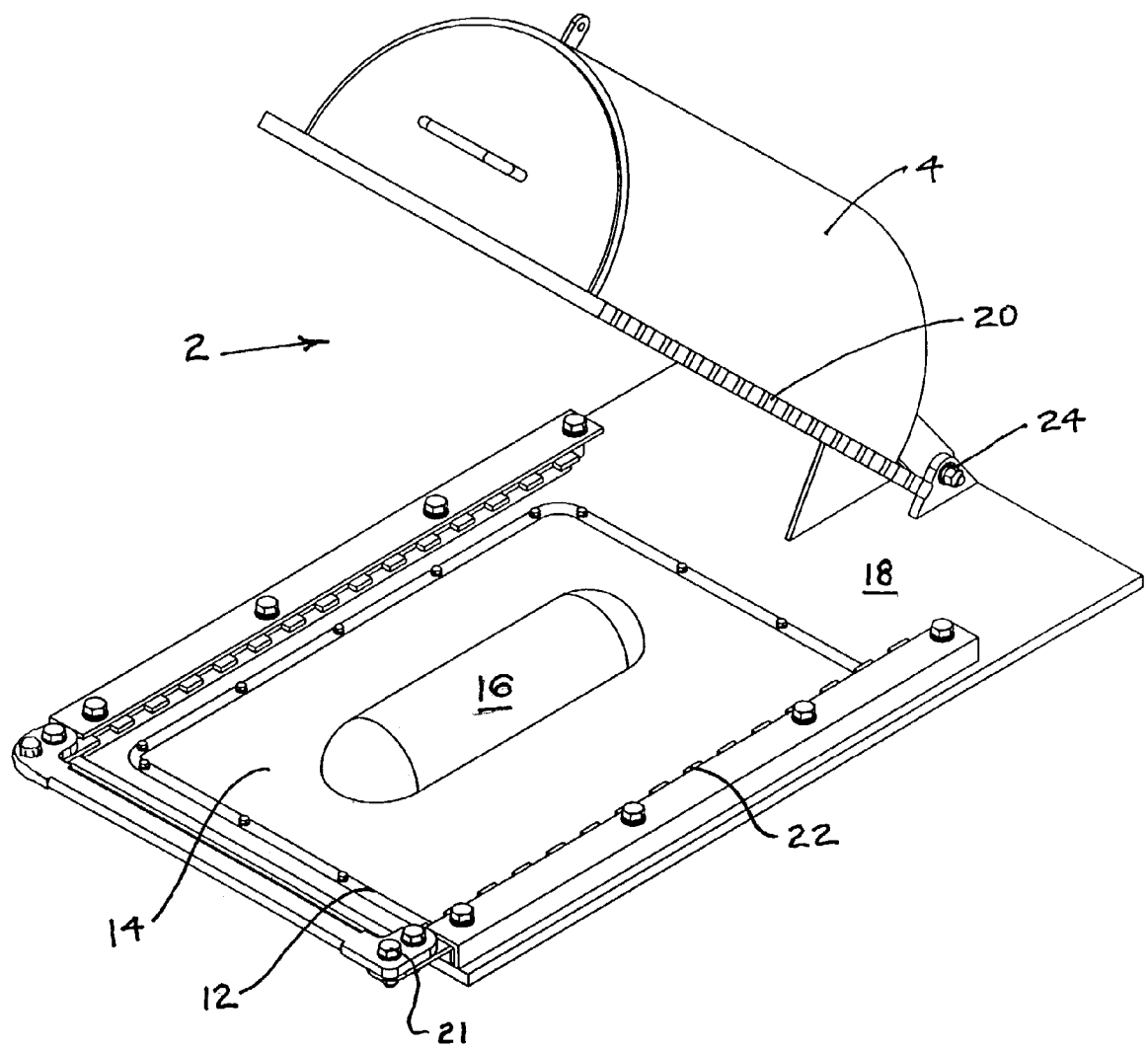
FIG. 6 is an isometric view of the air pressure molding apparatus with an air pressure chamber pivotally mounted on a pressure base plate, with a bladder stretched over the mold by a vacuum.

FIG. 6 is an isometric view of the air pressure molding apparatus 2 after the lower bladder 14 and retaining frame 12 have been applied over the mold 16. The single air pressure chamber 4 is pivotally mounted on a pressure base plate 18. After the mold 16 is positioned on the plate 18 between the lock down mechanisms 22 on either side of the base plate 18, the lower bladder 14 and hold down frame 12 are positioned over the mold 16. The bladder 14 has been stretched over the mold 16 by a vacuum drawn between the bladder 14 and the plate 18.

Figure 7:
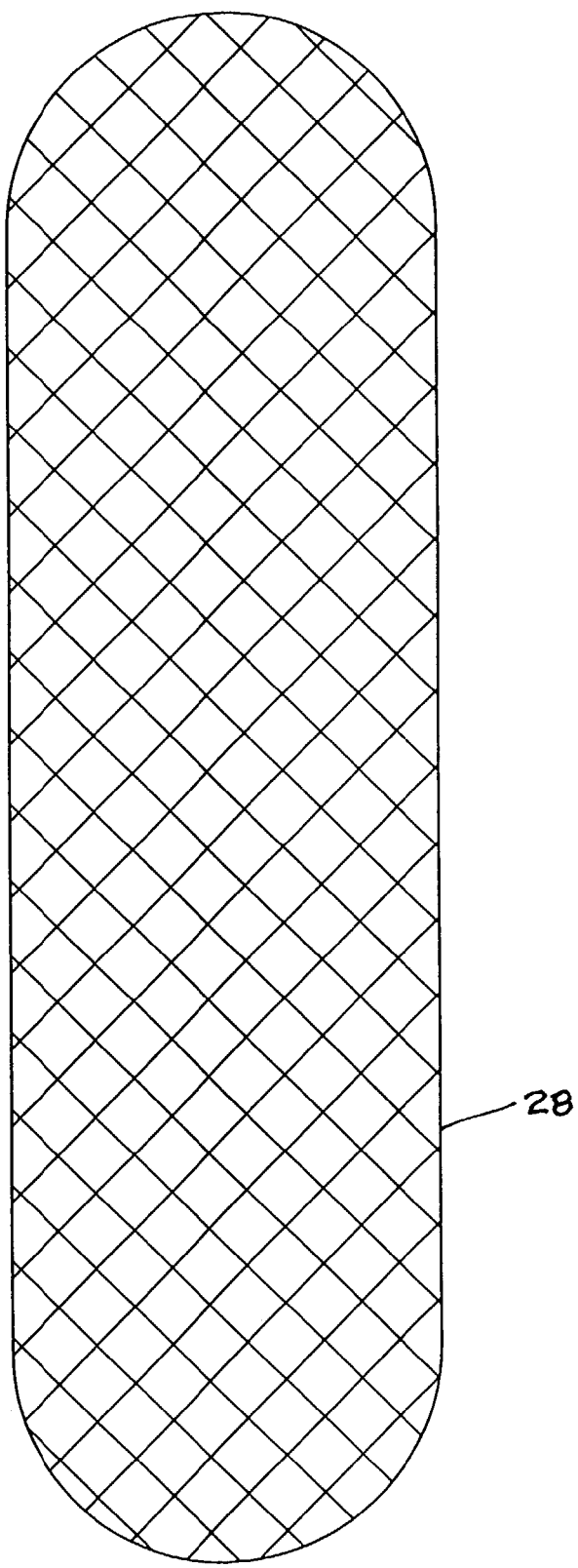
FIG. 7 illustrates a plan view of a Twintex or thermoformable fibre reinforced composite material to be heated and moved into the apparatus and positioned on the mold.
Figure 8:
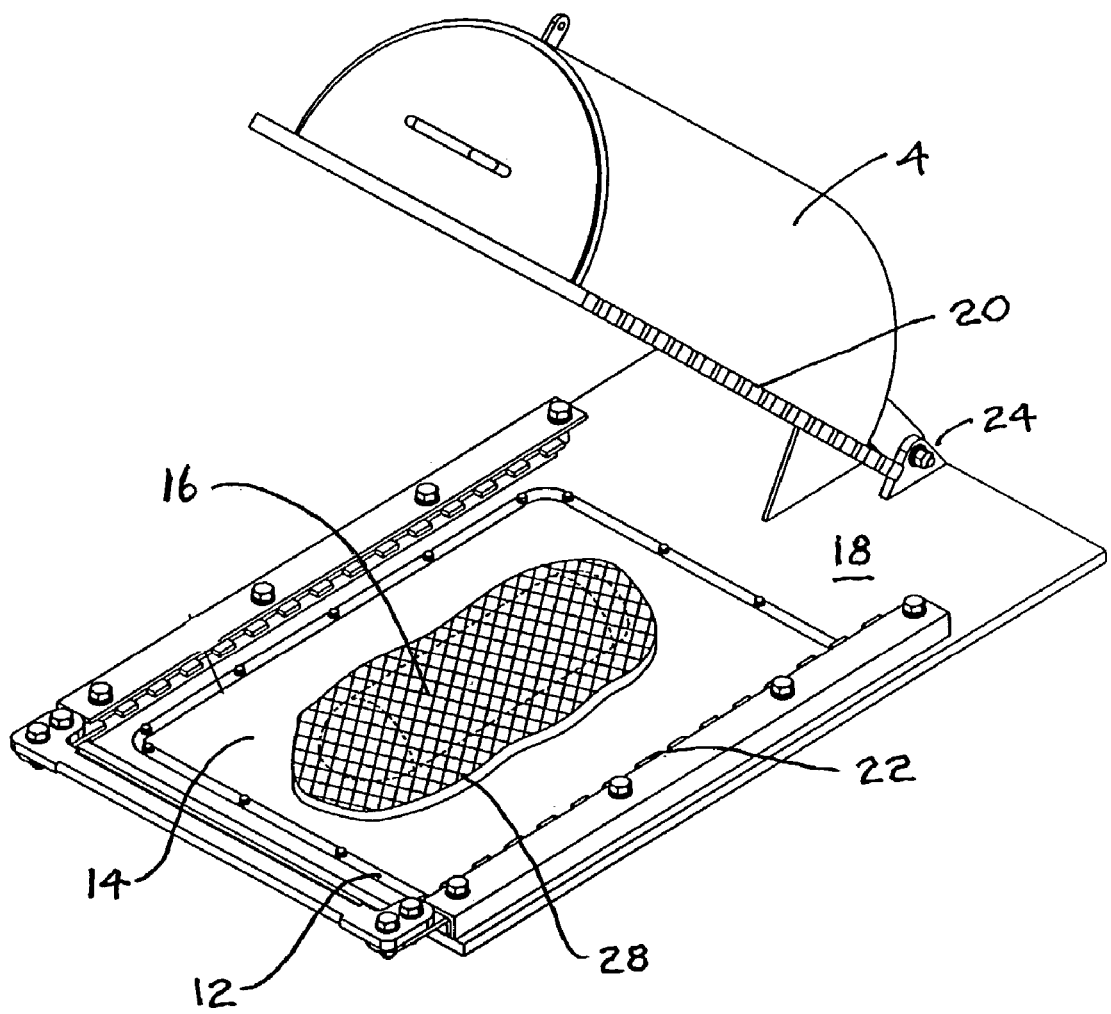
FIG. 8 is an isometric view of the air pressure molding apparatus with an air pressure chamber pivotally mounted on a pressure base plate and lock down mechanisms with a mold positioned on the plate between the lock down mechanisms on either side of the base plate illustrating the heated thermoformable fibre reinforced composite material (Twintex) in position on the bladder over the mold.

FIG. 7 illustrates a plan view of a Twintex or thermoformable fibre reinforced composite material 28 to be heated and moved into the apparatus and positioned on the mold and lower bladder 14, as shown in FIG. 8.

FIG. 8 is an isometric view of the air pressure molding apparatus 2 with the single air pressure chamber 4 pivotally mounted on a pressure base plate 18 and lock down mechanisms 20, 22. A mold 16 is first positioned on the plate 18 between the lower lock down mechanisms 22 on either side of the base plate 18. The lower bladder 14 and retaining frame 12 are then positioned over the mold 16 and vacuum is applied as shown in FIG. 6. The hot thermoformable fibre reinforced composite material (Twintex) 28 is then positioned on the bladder 14 over the mold 16.

Figure 9:
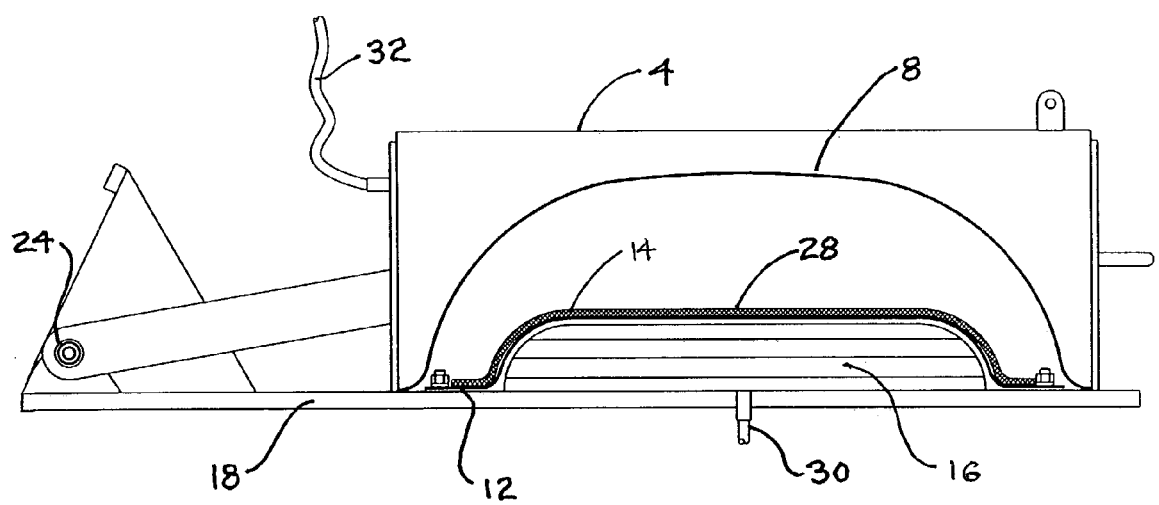
FIG. 9 is a side section view of the air pressure chamber, with upper bladder raised within the air pressure chamber by a vacuum, a heated to forming temperature thermoformable fibre reinforced composite material positioned on the lower bladder, and a vacuum formed over the mold. The mold is positioned on the lower pressure base plate over the inlet/outlet port.

FIG. 9 is a side section view of the air pressure chamber 4, with upper bladder 8 raised within the air pressure chamber 4 using vacuum, drawn through outlet 32. The hot thermoformable fibre reinforced composite material 28 is positioned on the lower bladder 14, retaining frame 12, mold 16 and the lower pressure base plate 18. FIG. 9 also illustrates air inlet/outlet 30 in the pressure plate 18 and air inlet/outlet 32 in chamber 4. As seen in FIG. 9, the air chamber 4 has been closed on the pressure plate 18. The bladder 14 is vacuum drawn tightly around the mold. This provides the following advantages: A smooth high gloss satin or mat finish can be applied to the molded part with very little mold preparation. It also provides a method of rapidly demolding the part by applying a positive pressure between the bladder and the mold. Setting up the mold and the vacuum drawn bladder on the mold must be done prior to heating and forming the thermoformable material 28. The pressure is maintained by pressure applied to the upper bladder 8 until the part has cooled to the point where it will not deform after it has been demolded. With Twintex, the demolding temperature is about 100° C.

Figure 10:
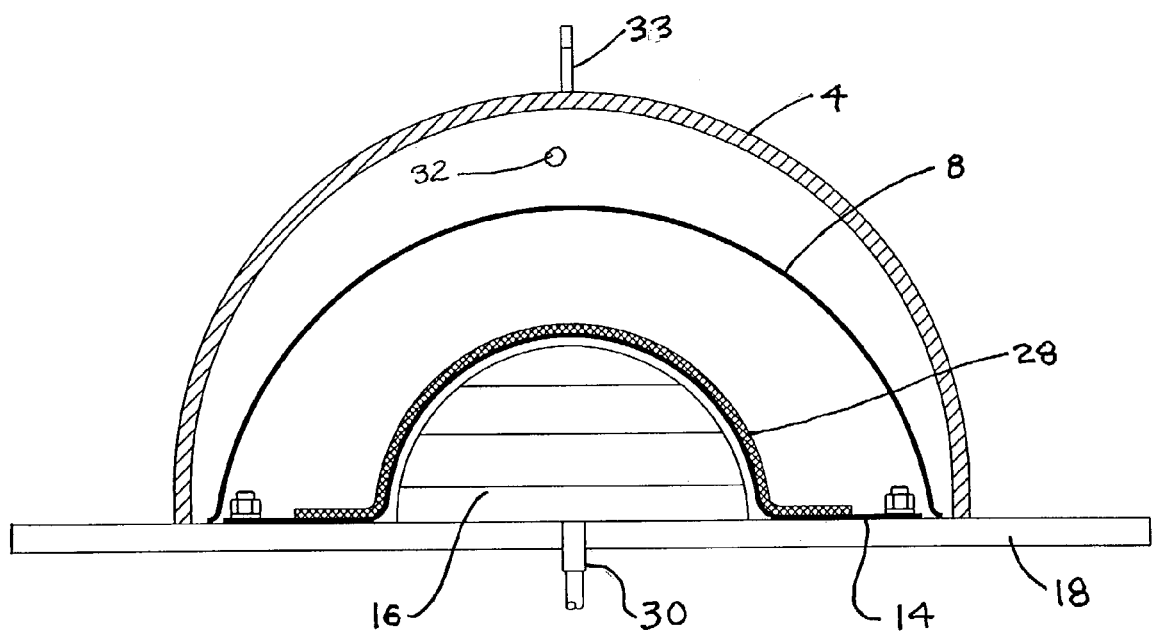
FIG. 10 is an end section view of the air pressure chamber, with upper bladder raised within the air pressure chamber, a heated thermoformable fibre reinforced composite material positioned on the lower bladder, with vacuum applied over the mold and the lower pressure base plate.

FIG. 10 is an end section view of the air pressure chamber 4, with upper bladder 8 raised within the air pressure chamber so that it can be closed over the mold 16 and pressure plate 18. The thermoformable fibre reinforced composite material 28 is positioned on the lower bladder 14, mold 16 and the lower pressure base plate 18. A vacuum is drawn through inlet/outlet 30 so that the lower bladder 14 is snugly held over the mold. The hot composite material is positioned on the bladder over top of the mold. A connector eye 33 for a pulley system is used for lifting the chamber 4 of the mold 16 and base plate 18.

Figure 11:
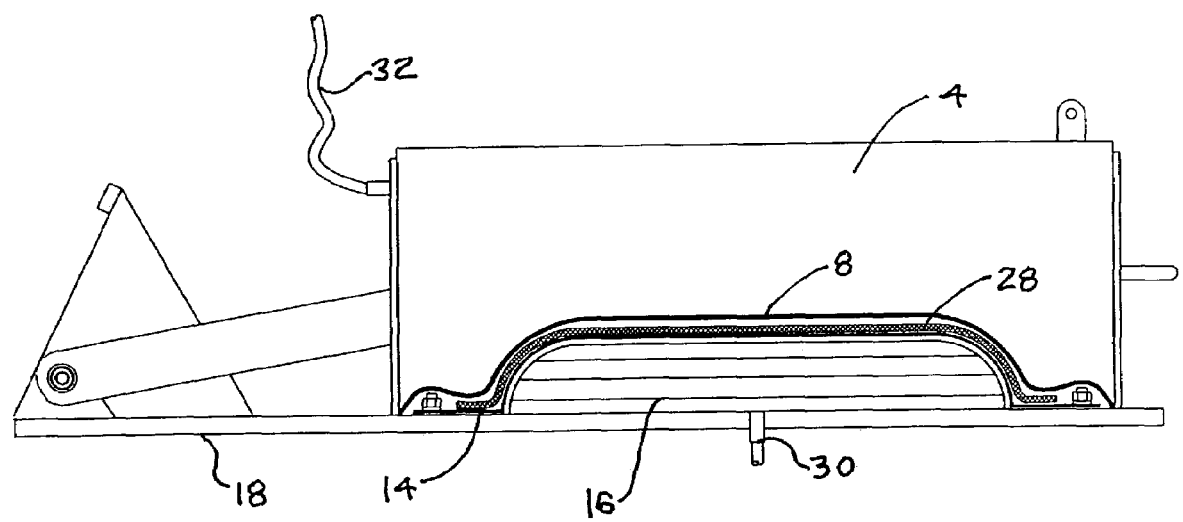
FIG. 11 is a side elevation section view of the air pressure chamber, with the upper bladder forced down on the hot thermoformable fibre reinforced composite material by positive air pressure in the upper chamber.

FIG. 11 is a side section view of the air pressure chamber 4, with the upper bladder 8 forced down on the thermoformable fibre reinforced composite material 28 by positive air pressure exerted in the chamber 4 through inlet 32. This causes the thermoformable fibre reinforced composite material 28 to conform closely over the lower bladder 14 and mold 16 so that voids between the composite material 28 and lower bladder 14, mold 16 are avoided.

Figure 12:
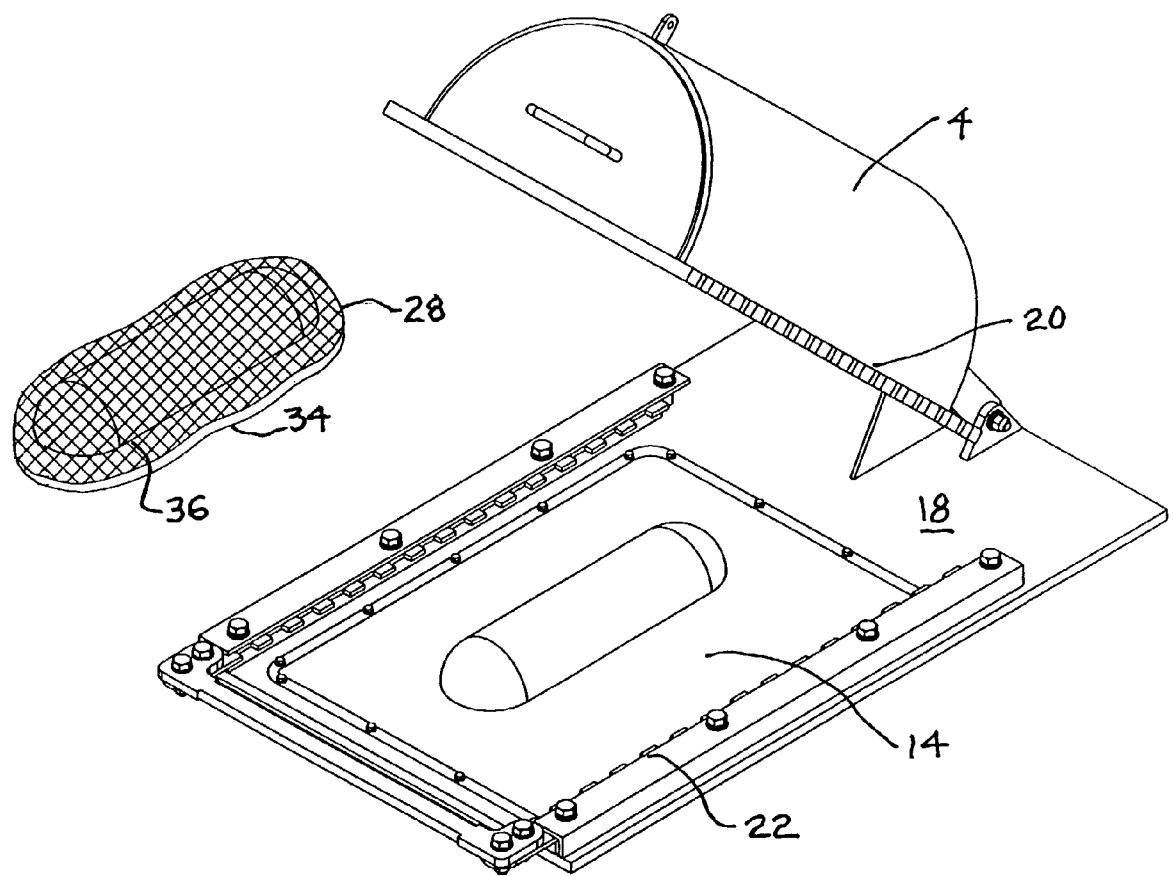
FIG. 12 is an isometric view of the air pressure molding apparatus with an air pressure chamber pivotally mounted on a pressure base plate and lock down mechanism. The thermo-composite part has cooled and consolidated and is ready for trimming of the circumferential flash.

FIG. 12 is an isometric view of the air pressure molding apparatus with the air pressure chamber 4 pivotally raised off the pressure base plate 18 after the air pressure has been released and the lock down mechanism 20, 22 has been disengaged. The material 28 has cooled to a solid state and the thermoformed composite material 28 has been thermoformed to take the shape of the lower bladder 14 over the mold 16. The thermoformed fibre reinforced composite material 28 has been lifted off the lower bladder. The composite material 28 has a flash material 34, with trim line 36 around its circumference.

Figure 13:
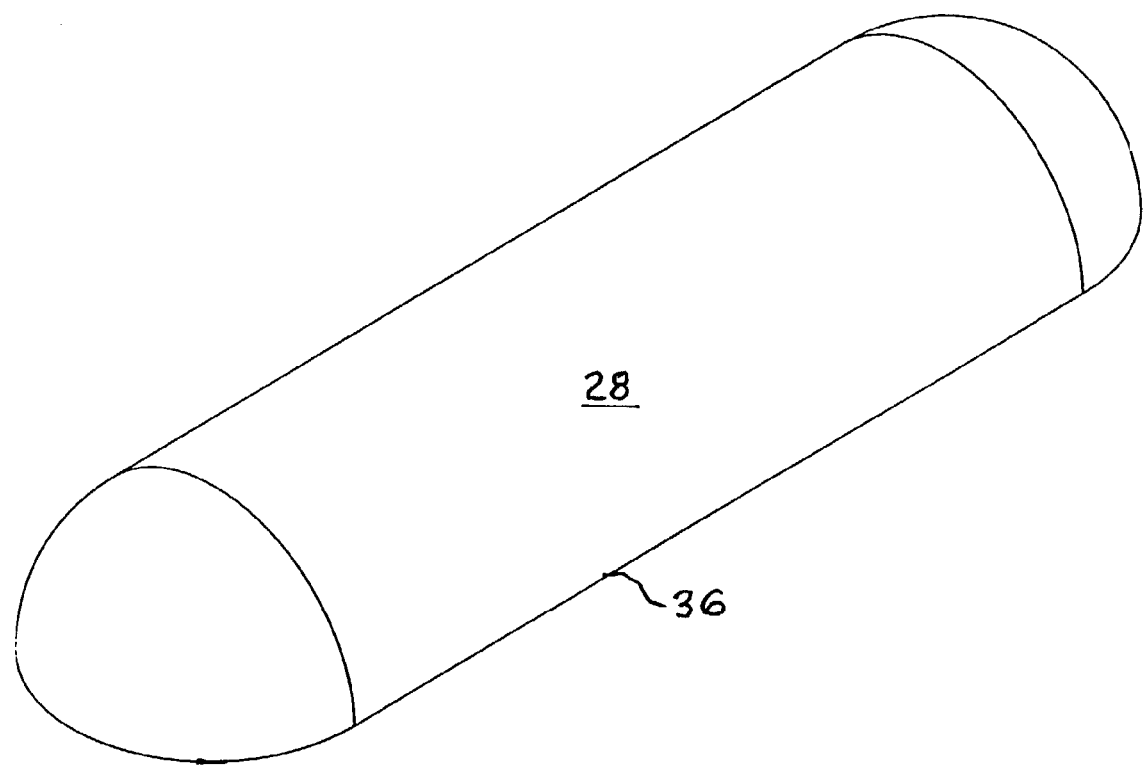
FIG. 13 is an isometric view of the molded thermoformed fibre reinforced composite material with circumferential flash trimmed away along the trim line.

FIG. 13 is an isometric view of the molded thermoformed fibre reinforced composite material 28 with the circumferential flash 34 (shown in FIG. 12) trimmed away along trim line 36.

Figure 14:
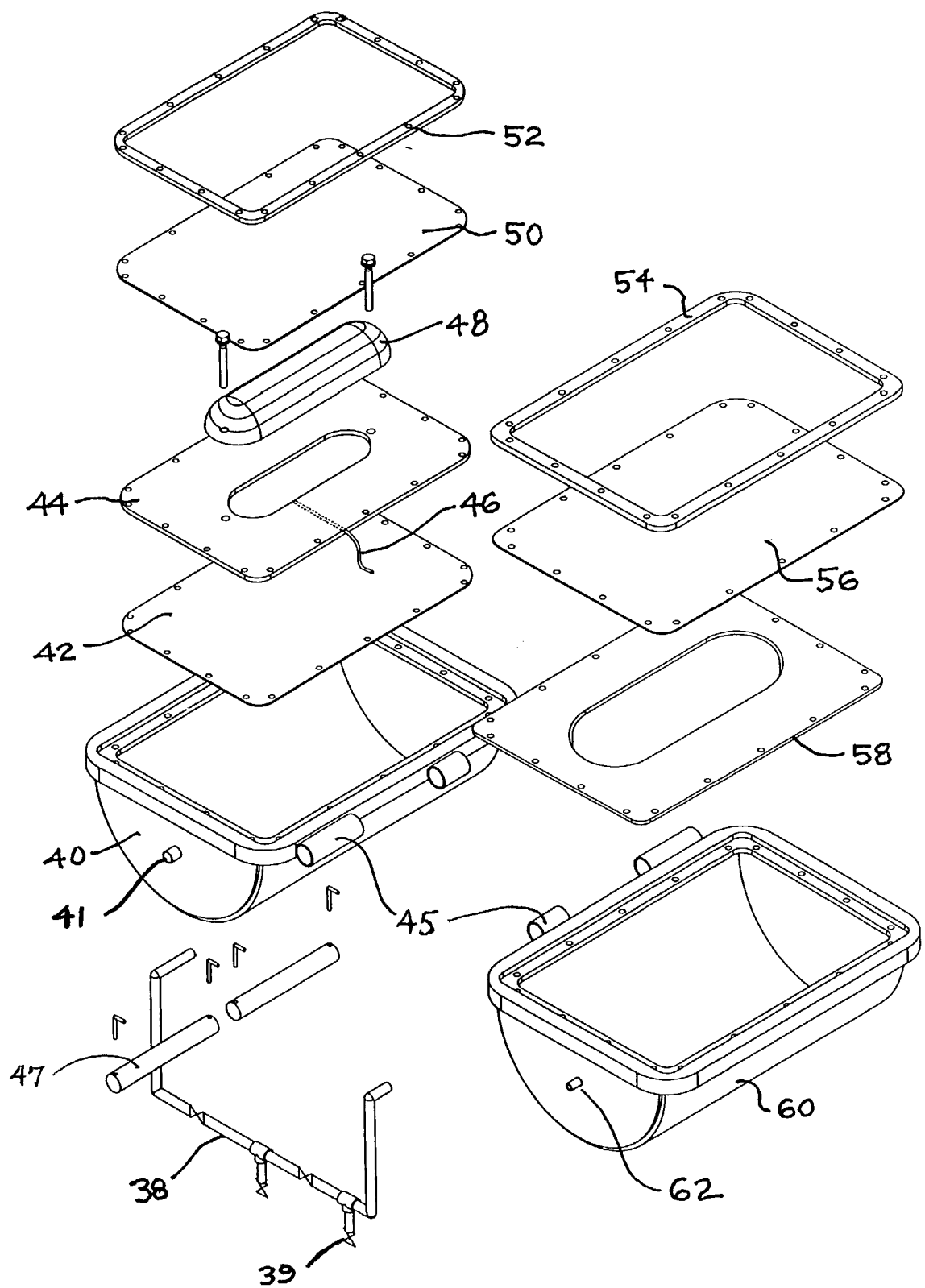
FIG. 14 is an exploded isometric view of a second embodiment of the invention comprising a double pressure chamber with triple bladder system.

FIG. 14 is an exploded isometric view of a second embodiment of the invention comprising a double pressure chamber with triple bladder. Specifically, FIG. 14 illustrates clockwise from the bottom left flexible air pressure manifold lines 38, with control valves 39, lower pressure chamber 40, chamber connector hinge 45, hinge axis pins 47, lower bladder 42, lower flange plate 44, with an inlet/outlet 46, convex mold 48, second lower bladder 50, second lower bladder retaining frame 52, upper retaining frame 54, upper bladder 56, upper flange 58, and upper air pressure chamber 60. Chamber 40 has a connecting air inlet/outlet connector 41 which connects with the manifold 38. Likewise, chamber 60 has an inlet/outlet connector 62 which connects with manifold 38.

Figure 15:
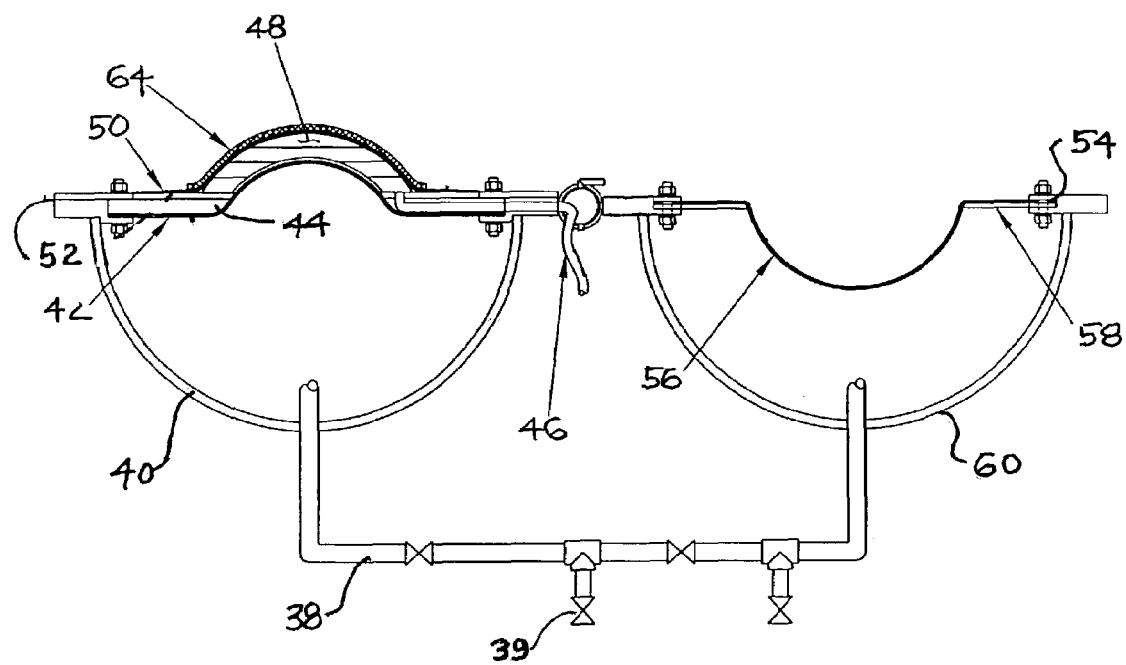
FIG. 15 illustrates an end section view of the double pressure chamber and triple bladder second embodiment of the invention with a positive or convex mold and the composite material in place on the bladder, vacuum formed to the mold.

FIGS. 15 to 20 show a sequence of steps for molding a thermoformable composite or thermoplastic material on a positive (convex) mold surface. FIG. 15 illustrates an end view of the double pressure chamber and triple bladder second embodiment of the invention. Specifically, FIG. 15 illustrates at the left, the flexible air pressure manifold lines 38, control valves 39, the lower pressure chamber 40, the lower bladder 42, the lower flange plate 44, the convex (positive) mold 48, the vacuum tube 46, the second lower bladder 50, and second lower bladder retaining frame 52. The thermoformable composite material 64 is draped over the second lower bladder 50 above the mold 48. At the right side, the upper retaining frame 54, upper bladder 56, upper flange 58, and upper air pressure chamber 60 are pivotally connected to the first chamber 40. Bladders 42 and 50 are sealed so that a vacuum can be drawn between bladder 42 and bladder 50 through outlet 46 prior to placing the composite 64 on the bladder 50. A slight vacuum is applied to the second chamber 60 to stretch the bladder 56 so the chamber 60 can be closed over one mold. The double pressure chambers design permits balanced loading to be applied to both sides of the mold. An equal and opposing force to the side of the mold opposite to the thermocomposite material can be applied. This enables large parts to be molded using inexpensive mold materials without deformation. Otherwise, expensive mold materials and extremely strong pressure plates and other components would be required.

Figure 16:
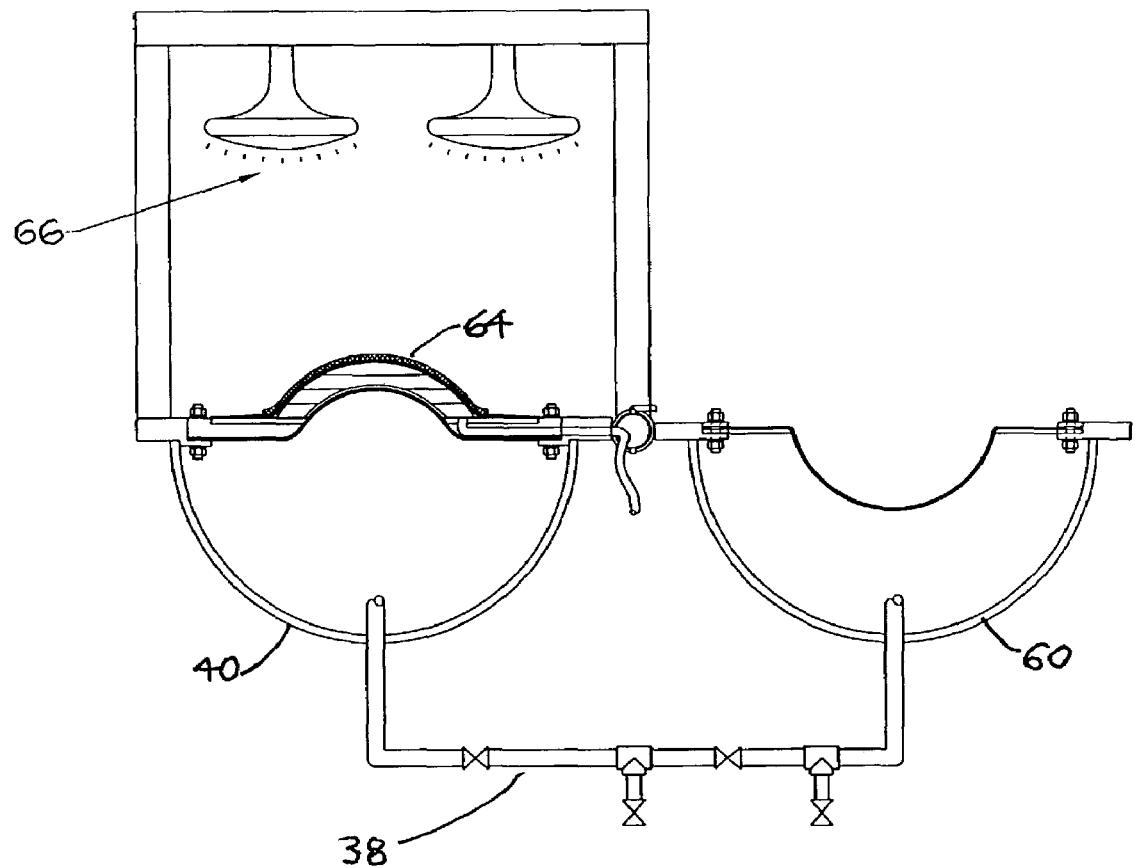
FIG. 16 illustrates an end view of the double pressure chamber and triple bladder second embodiment of the invention including infrared heat source for heating in place the thermoformable fibre reinforced composite material, such as Twintex, with flexible manifold air lines.

FIG. 16 illustrates an end view of the double pressure chamber and triple bladder second embodiment of the invention as described above for FIG. 15 but including an infrared heat source 66 for heating the thermoformable fibre reinforced composite material 64, such as Twintex, or nonfibrous plastic such as ABS or polypropylene. The infrared heat source heats the thermoplastic resin to its forming temperature which, for example, is 200° C. for Twintex.

Figure 17:
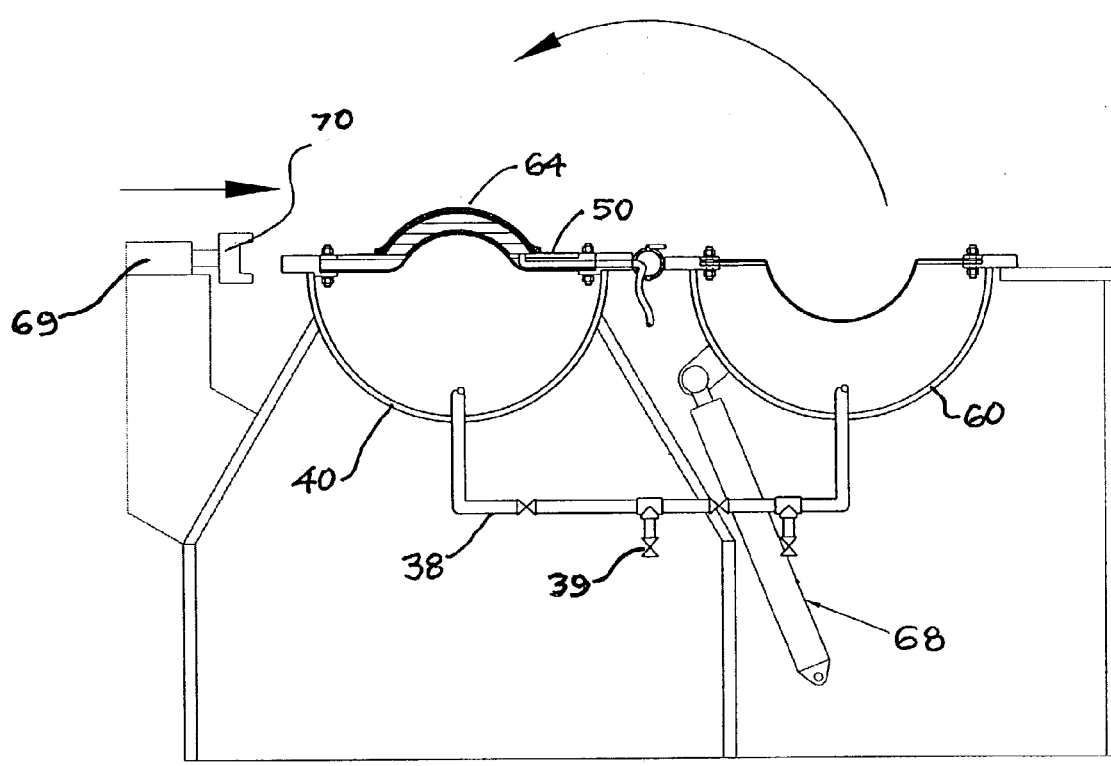
FIG. 17 illustrates an end section view of the double air chamber, triple bladder system, after the thermoformable fibre reinforced composite material has been heated on the mold covered by the second lower bladder, with the upper air pressure chamber being closed over the lower air pressure chamber as indicated by the curved arrow and the air cylinder closing the locking mechanism as indicated by the straight arrow. The vacuum draws the upper bladder away from the mold in the shape of the opening of the flange.

FIG. 17 illustrates an end section view of the double air chamber, triple bladder system, after the thermoformable fibre reinforced composite material 64 has been heated to its forming temperature and the heat source has been re-moved. The upper air pressure chamber 60 is being closed over the lower air pressure chamber 40 as indicated by the curved directional arrow. The upper air pressure chamber 60 is pivotally moved over to a position above the lower air pressure chamber 40 by an air pressure cylinder 68. The locking mechanism 70 is then moved to a locking position by cylinder 69 as indicated by the straight arrow. The air tubes 38 are flexible to accommodate the pivotal movement of the upper air pressure chamber 60 over the lower air pressure chamber 40.

Figure 18:
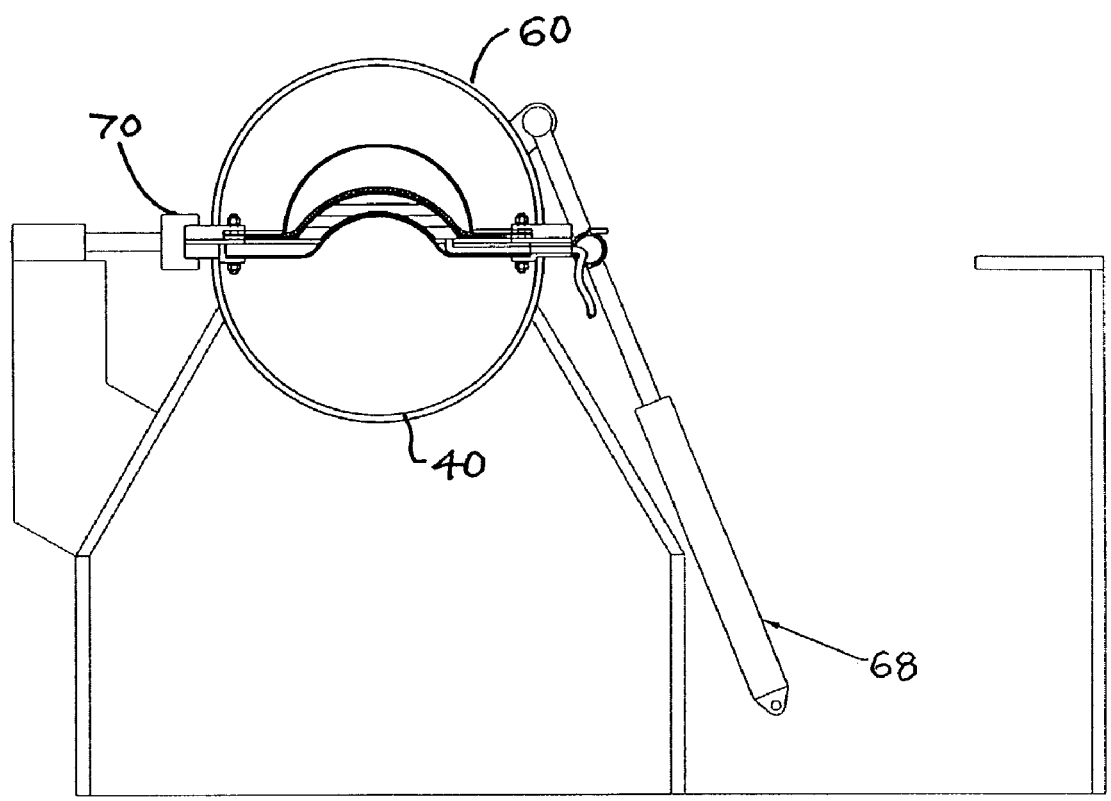
FIG. 18 illustrates an end section view of the double air chamber, triple bladder system with the upper air pressure chamber being closed over the lower air pressure chamber and the lock down mechanism engaged prior to equalizing pressures in each chamber on either side of the mold.

FIG. 18 illustrates an end section view of the double air chamber, triple bladder system, with the upper air pressure chamber 60 closed over the lower air pressure chamber 40 and the lock down mechanism 70 on the upper and lower air pressure chambers 40, 60 has been locked. The upper bladder 56 clears the composite material and mold when the chamber 60 is closed.

Figure 19:
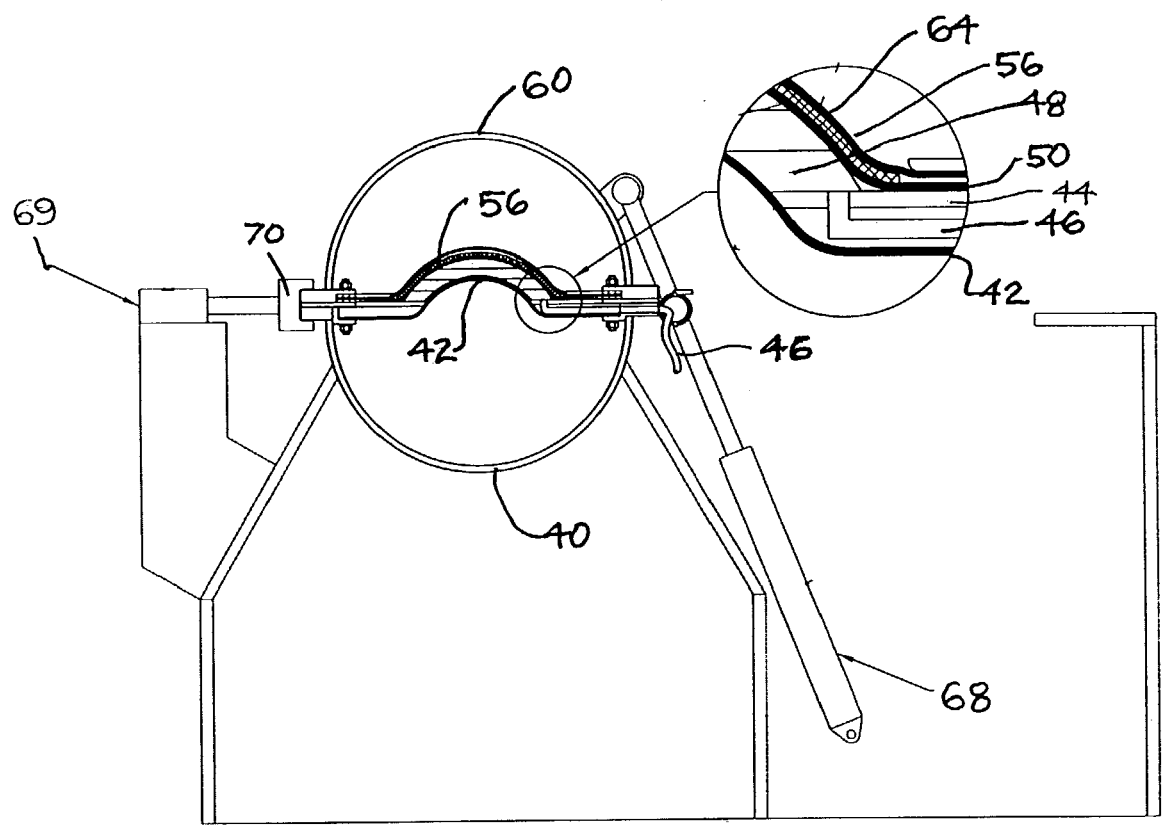
FIG. 19 illustrates an end section view of the double air chamber, triple bladder system, wherein the bladder in the upper chamber has been pressured down on the thermoformed material. The upper chamber is sealed from the lower chamber by the three bladders which are sealed at the edges by the retaining frames.

FIG. 19 illustrates an end section view of the double air chamber, triple bladder system, after the upper air pressure chamber 60 has been closed over the lower air pressure chamber 40, the lock down mechanism 70 has been engaged, and the upper bladder 56 in the upper air pressure chamber 60 has been forced downwardly on the thermoformable fibre reinforced composite material 64 by introducing positive air pressure in the upper chamber 60. A balanced counter pressure is delivered simultaneously to the lower chamber 40 via the married manifold air pressure system (see FIG. 17). A vacuum has previously been drawn between the first and second lower bladders 42, 50 through outlet tube 46 as discussed in FIG. 15. FIG. 19 in the enclosed circle illustrates an enlarged detailed view of the upper bladder 56, the thermoform reinforced composite material 64, the second lower bladder 50, the mold 48, the air vacuum tube 46, lower flange plate 44, and the first lower bladder 42 in stacked and consolidated relationship.

Figure 20:
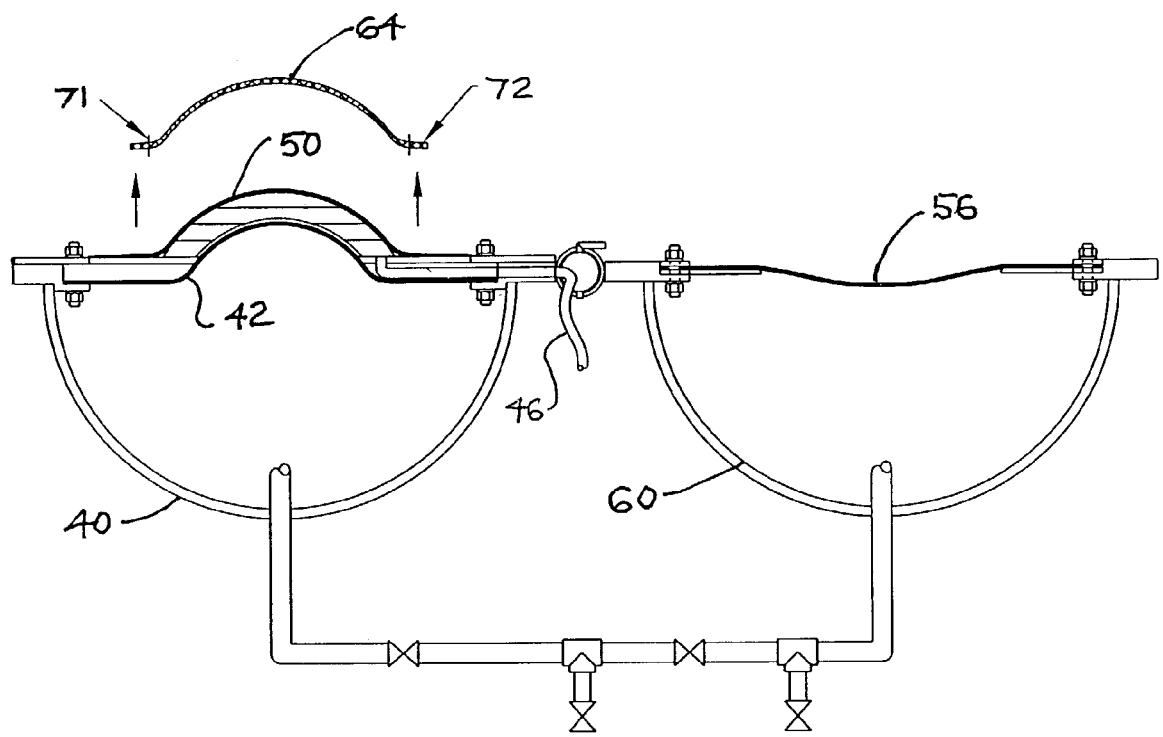
FIG. 20 illustrates an end section view of the dual air pressure chamber, triple bladder embodiment with the upper air pressure chamber pivoted away from the lower air pressure chamber, with the molded thermoformable fibre reinforced material lifted up off the second lower bladder above the mold, including flash around the thermoformable material. The molded part is now ready for trimming.

FIG. 20 illustrates an end section view of the dual air pressure chamber, triple bladder embodiment subsequent to FIG. 19 with the upper air pressure chamber 60 pivoted away from the lower air pressure chamber 40, with the molded thermoformable fibre reinforced material 64 lifted up off the second lower bladder 50 above the mold 48, including flash 72 and trim line 71 around the thermoformable material 64. There is no pressure in chambers 40 and 60. The flash 72 is later trimmed away (not shown). After pressurizing and cooling, the vacuum can be released through outlet 46 and a slight pressure then applied to assist in demolding the material 64.

Figure 21:
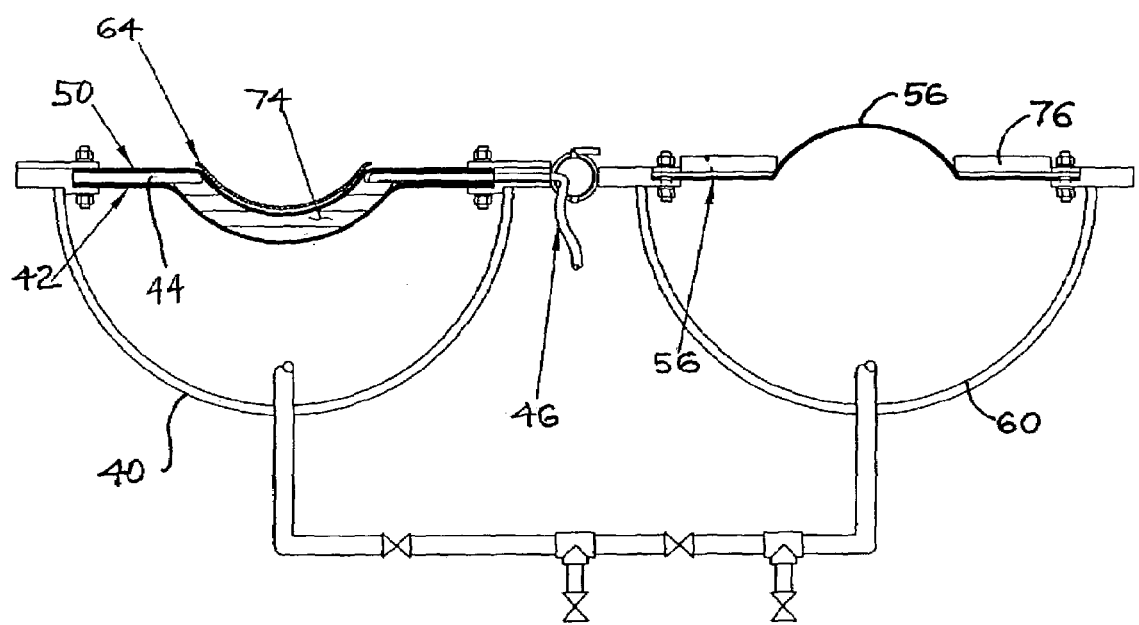
FIG. 21 illustrates an end view of the double pressure chamber and triple bladder third embodiment of the invention, with a negative (convex) mold. The upper chamber uses pressure to raise the third bladder.

FIGS. 21 to 26 illustrate in sequence the configuration and operation of a third embodiment of the invention. FIG. 21 illustrates an end view of a double pressure chamber and triple bladder third embodiment of the invention. This embodiment has a negative or convex mold. The configuration illustrated in FIG. 21 is similar to the configuration FIG. 15 except that a convex surface (negative) mold 74 is installed in the lower chamber 40 on the opposite side of the lower flange plate 44. The upper flange plate 76 is positioned above the upper bladder 56 (with the chamber closed), rather than underneath the upper bladder, as shown in FIG. 15, with slight positive air pressure applied to prestretch the bladder 56. Otherwise, the components are similar to those shown for the second embodiment illustrated in FIG. 15. In order to mold complex deep draw composite shapes, the composite material used is in the form of a thick woven fabric which can be cut into pattern shapes and positioned on the mold prior to heating. This allows accurate and even application of thickness or ply over the surface of the mold.

Figure 22:
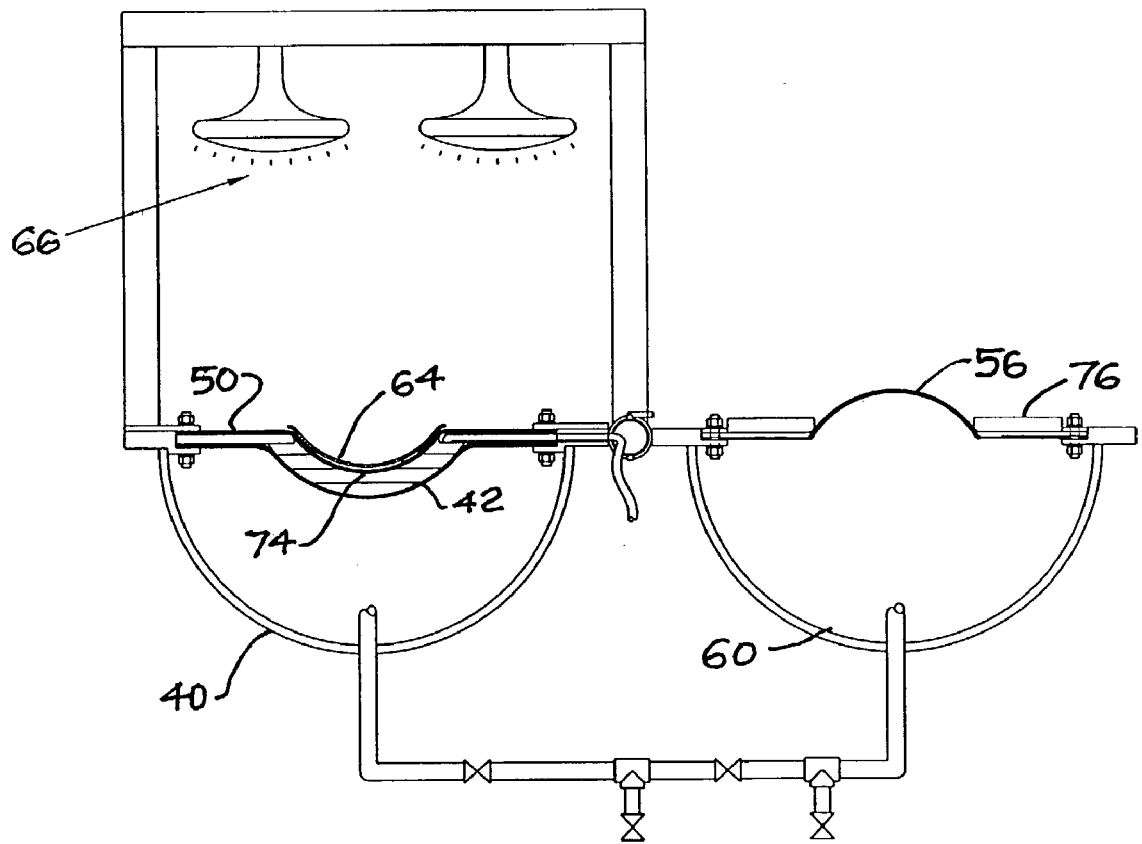
FIG. 22 illustrates an end view of the double pressure chamber and triple bladder third embodiment of the invention including infrared heat source for heating in place the thermoformable fibre reinforced composite material, such as Twintex.

FIG. 22 illustrates an end view of the double pressure chamber and triple bladder second embodiment of the invention including infrared heat source 66 for heating in place the thermoformable fibre reinforced composite material 64, such as Twintex. The infrared heat source heats the thermoformable fibre reinforced composite material 64 to the forming temperature of the plastic resin used in the thermoformable material.

Figure 23:
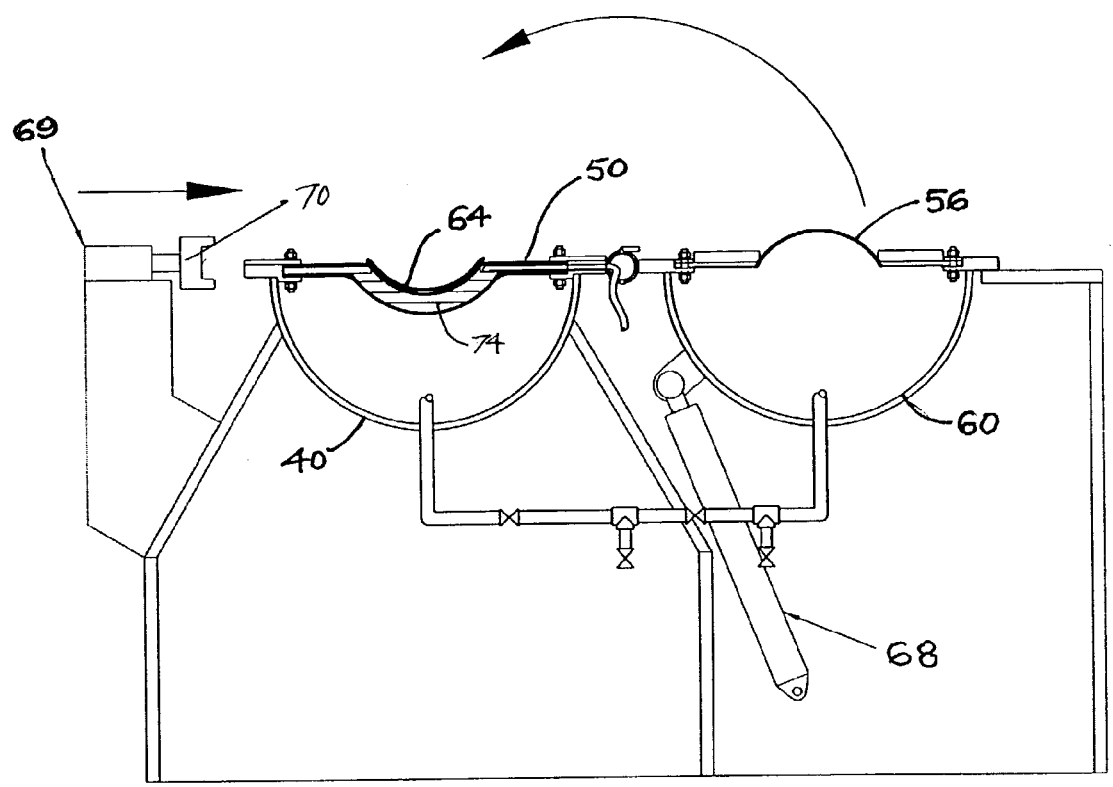
FIG. 23 illustrates an end section view of the double air chamber, triple bladder system, after the thermoformable fibre reinforced composite material has been heated on the mold and consolidated to the shape of the second lower bladder, with the upper air pressure chamber being closed over the lower air pressure chamber as indicated by the arrow. A vacuum stretches the second bladder over the mold.

FIG. 23 illustrates an end section view of the double air chamber, triple bladder system, after the thermoformable fibre reinforced composite material 64 has been heated to the thermforming temperature of the plastic resin and the heat source removed. A vacuum stretches the second bladder 50 over the mold 74 prior to heating. The composite material 64 is laid in position on the mold. The upper air pressure chamber 60 is closed over the lower air pressure chamber 40 by the air cylinder 68 as indicated by the arrow. The cylinder 69 locks the lock 70 as indicated by the straight arrow.

Figure 24:
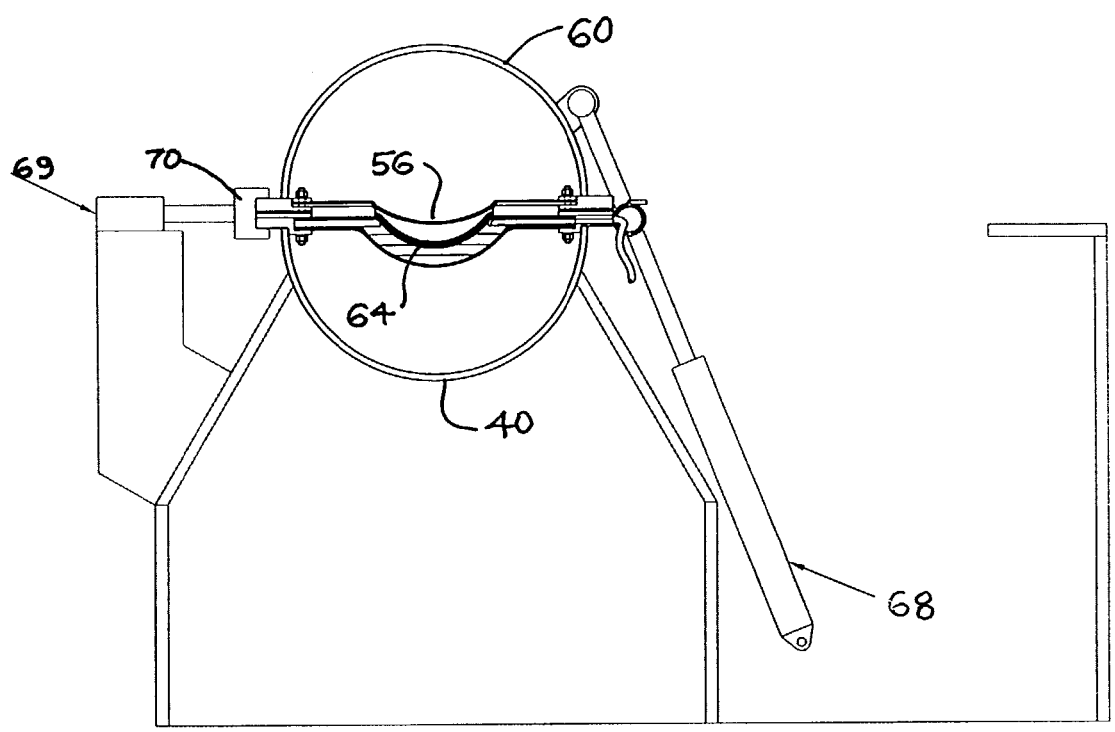
FIG. 24 illustrates an end section view of the double air chamber, triple bladder system with the upper air pressure chamber being closed over the lower air pressure chamber and the upper and lower air pressure chambers have been locked prior to pressurizing both chambers equally.

FIG. 24 illustrates an end section view of the double air chamber, triple bladder system, after the thermoformable fibre reinforced composite material 64 has been heated to the thermoforming temperature of the plastic resin, with the upper air pressure chamber 60 closed over the lower air pressure chamber 40 and the lock down mechanism 70 engaged. The bladder 56 is raised off the material 64 to be formed.

Figure 25:
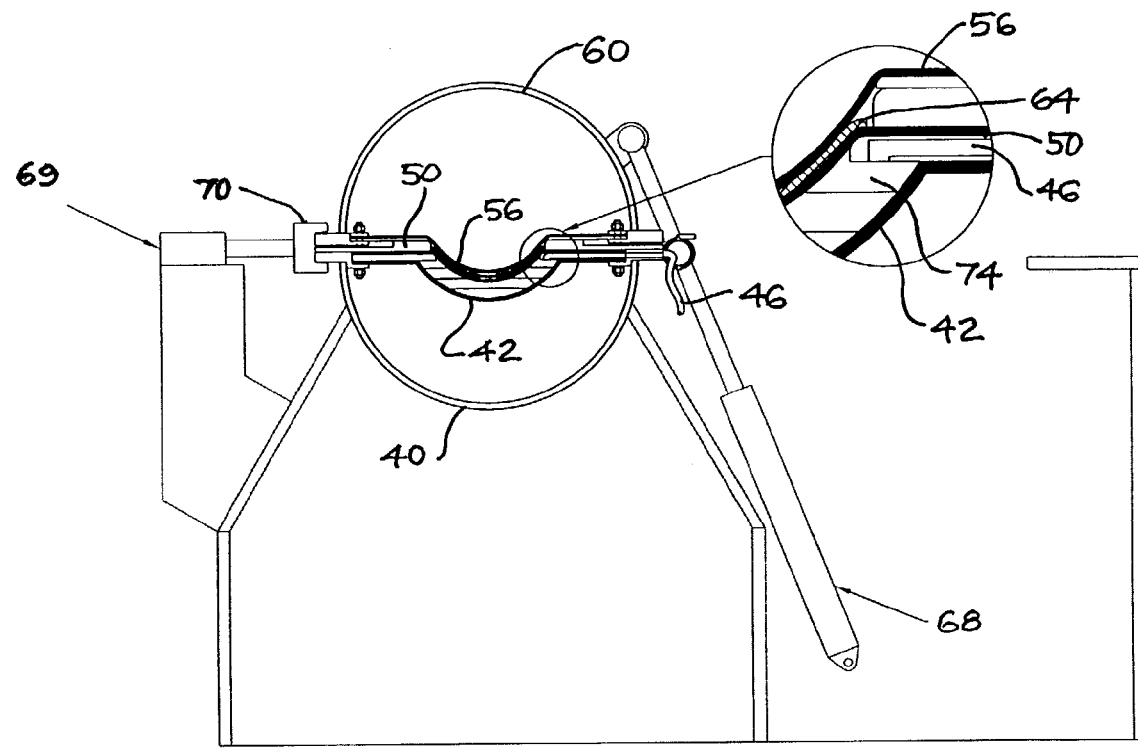
FIG. 25 illustrates an end section view of the double air chamber, triple bladder system with the bladder of the upper air pressure chamber being pressured down on the thermoformable material, with equal air pressure in each chamber with the flexible manifold.

FIG. 25 illustrates an end section view of the double air chamber, triple bladder system, with the upper air pressure chamber 60 closed over the lower air pressure chamber 40 and the upper bladder 56 has been forced down onto the composite material 64 by positive air pressure introduced into the upper chamber 60 with an equal and opposing counterforce applied to the bottom of the mold 74, lower bladder 42 and lower flange plate 50, via an equal amount of air pressure delivered to both pressure chambers 60, 40 via the married manifold air delivery system 38 (not shown—see FIG. 17). FIG. 25 in the enclosed circle illustrates an enlarged detailed view of the upper bladder 56, the thermoformable reinforced composite material 64, the second lower bladder 50, the mold 48, the air vacuum tube 46, and the first lower bladder 42 and the lower flange plate 50 in stacked relationship. Equal air pressure is applied to chambers 40 and 60 through the married manifold.

Figure 26:
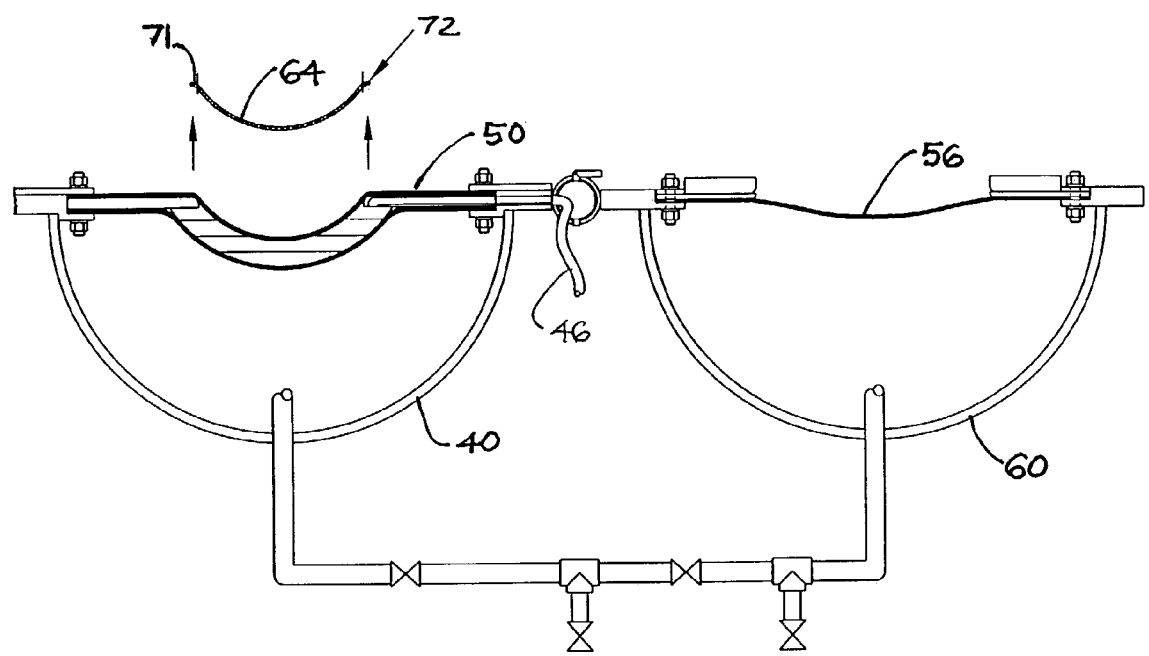
FIG. 26 illustrates an end section view of the dual air pressure chamber, triple bladder third embodiment with the upper air pressure chamber pivoted away from the lower air pressure chamber, with the molded thermoformable fibre reinforced material lifted up off the second bladder above the mold, including flash around the thermoformable material. The molded part is now ready for trimming.

FIG. 26 illustrates an end section view of the dual air pressure chamber, triple bladder third embodiment with the upper air pressure chamber 60 pivoted away from the lower air pressure chamber 40, with the negative molded thermoformable fibre reinforced material 64 lifted up off the second lower bladder 50 above the mold, including flash 72 and trim line 71 around the thermoformed part 64. The part is now ready for trimming. A concave molded thermoformable fibre reinforced composite material 64 is formed.

Figure 27:
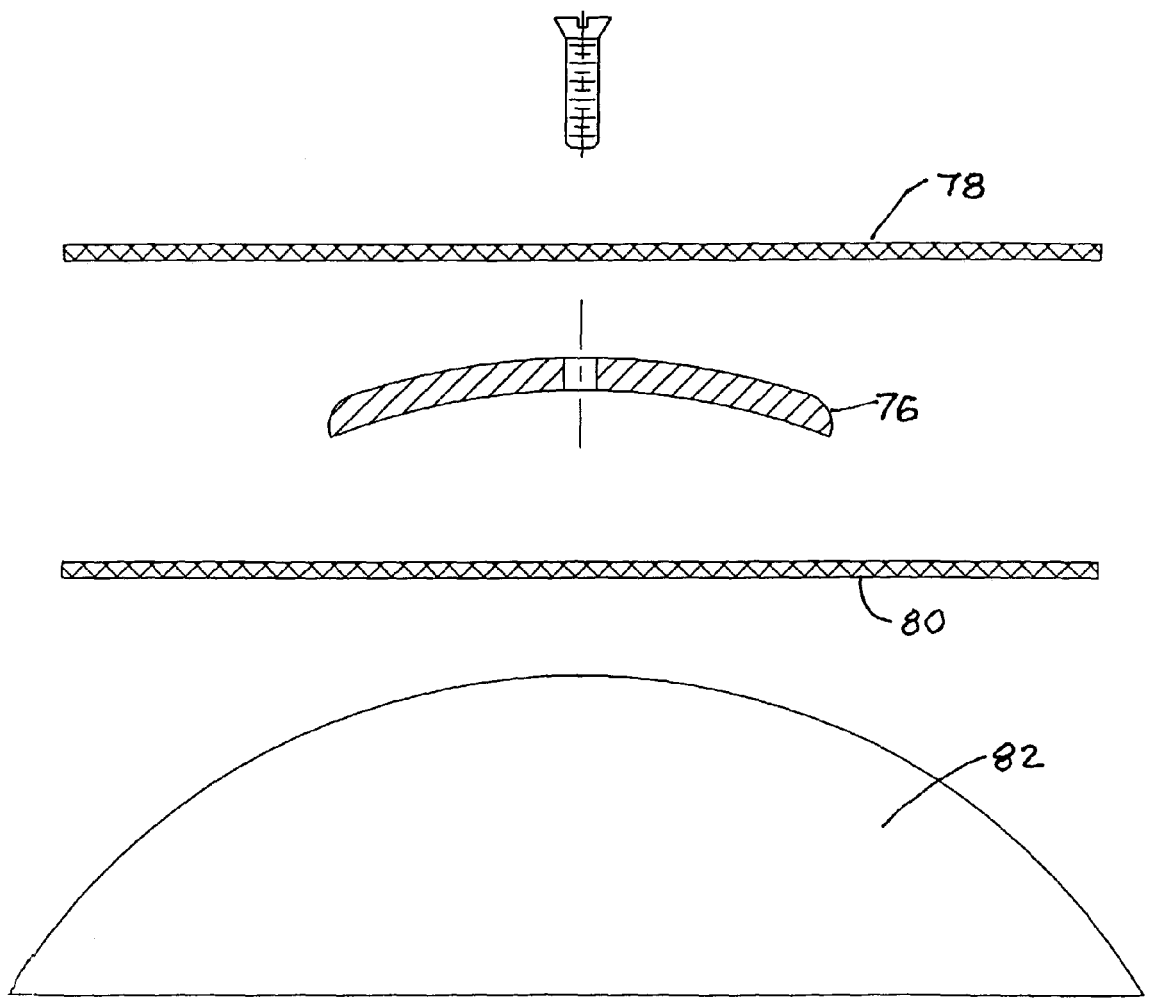
FIG. 27 illustrates an end exploded section view of a fourth embodiment of the invention wherein an embedded fastener attachment is formed between two layers of thermoformable fibre reinforced composite material over a convex mold. The fastener can be post machined to receive bolts, screws, rivets or other fasteners.

FIG. 27 illustrates an exploded end section view of a fourth embodiment of the invention wherein an embedded fastener attachment 76 is accurately located between two or more layers of thermoformable fibre reinforced composite material 78, 80 over a mold 82. A jig (not shown) or some other location device can be used to position the attachment accurately on the mold prior to heating and pressurizing the thermo-composite material.

Figure 28:
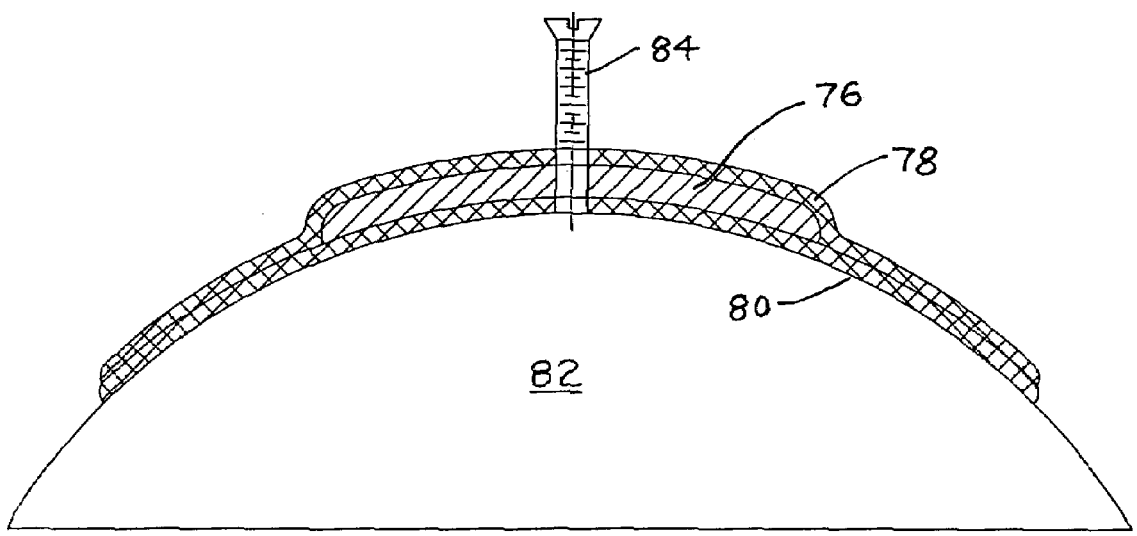
FIG. 28 illustrates an end section view of a fourth embodiment of the invention wherein an embedded fastener is formed between two layers of thermoformable fibre reinforced composite material over a convex mold and a bolt is installed, using the rapid molding process as illustrated in previous drawings and according to the description.

FIG. 28 illustrates an end section view of the fourth embodiment of the invention wherein the embedded fastener attachment 76 is encased between the two layers of thermoformable fibre reinforced composite material 78, 80 over the mold 82. The two layers 78, 80 are heated and then compressed together utilizing any of the three thermoforming methods illustrated in FIGS. 1 to 26. A bolt 84 is installed, using the rapid molding process as illustrated in previous drawings and according to the description. Embedded fasteners can be post machined to receive standard sized bolts, screws, rivets and the like.

General Description of Specific Embodiments of Process

1. Single chamber/Triple Bladder Rapid Molding System:

This system as illustrated in the drawings incorporates an air press assembly for forming thermoformable materials around an inexpensive mold material such as plaster or MDF male or female mold. The press consists of a removable pressure chamber in the form of a half-pipe section with sealed ends. The bottom surface of the pressure chamber consists of a sheet of special heat resistant, highly elastic silicone rubber material that is fastened to the bottom of the air chamber with a steel frame. The frame forms an airtight seal between the chamber and the silicone rubber sheet (referred to as the air bladder component of the pressure chamber). The air bladder is pulled up into the chamber with vacuum applied to the sealed chamber in order to make room in the chamber for the mold and hot thermo-composite material prior to pressure forming. The pressure chamber section is attached to a heavy-duty swing arm assembly that articulates with a thick reinforced steel base-plate assembly. The steel base plate assembly houses a heavy-duty lock-down mechanism for holding the pressure vessel down onto the plaster of paris mold or other inexpensive tooling used for the fabrication of the fiberglass or thermoplastic component. The base plate assembly also houses the air pressure and vacuum supply systems, with their control and safety systems. The base plate is bolted to the top of a workbench located close to a convection or infrared oven used to heat the thermo-composite or thermoplastic material.

2. Dual chamber/Triple Bladder Rapid Molding System:

This system provides a method of fabricating parts out of thermoplastic or thermoformable fiber composite materials, using very inexpensive tooling and very short cycle times for heating, pressurizing and cooling during the pressure-forming process. The system incorporates a dual chamber air press assembly for forming thermo-formable materials around an inexpensive male or female mold using a unique triple bladder/three chamber rapid molding system. The two chambers enable balanced loading or equal pressurization on both sides of the mold to be obtained. The two chambers also, prior to closing, permit use of vacuum or pressure to prestretch the bladders. The two chambers allow for separate heating cycles to be performed prior to consolidating (pressurizing) the different material used to make laminations prior to heating, pressurizing and cooling. The two chambers further enable unprecedented short cycle times and deep draws within the molds to be obtained using continuous fibre reinforcing. The tooling molds and components are also relatively simple and inexpensive to manufacture. In summary, much better fiber composite or thermoplastic parts can be made much less expensively and much more quickly. The two chambers sandwich a steel flange that holds a male or female mold. A vacuum chamber is created around the mold using highly elastic silicone membranes/diaphragms/heat resistant bladders (this vacuum chamber represents the third chamber in the three chamber system). Material to be pressure formed on a mold is heated locally to the working temperature of the binder resin in the composite material immediately prior to pressure forming. When both the substrate material and coating material, such as stretch lycra or clear polypropylene film, are at the correct forming temperature, the two chambers are closed and air pressure is quickly applied equally to both sides of the mold through the pressure chambers surrounding the flange holding the mold in order to pressure-form the hot thermo-composite material to the shape of the mold. This prevents the mold from deforming. Therefore, cheaper molding materials can be used to form large pieces. The pressure is supplied equally to the two chambers via a married flexible manifold and is maintained for the remainder of the cooling cycle. The total time between removing the heat source and applying 45 psi in the compression press must be less than ten seconds. This press design allows for rapid and even deployment of air pressure to thermo-composite material and mold. The triple chamber system allows for separate heating cycles for the base or substrate material and the cosmetic finish material or liquid coating material. The total heating, compressing and cooling cycles for Twintex using this method is about 20 minutes.

Part Fabrication Procedure:

In order to fabricate a fiberglass component with the subject technology using the single pressure chamber system, the Twintex composite material or other thermoformable material is positioned on a sheet of the thin, highly elastic, heat-resistant silicone rubber material held in a special aluminum frame assembly. Any cosmetic finish materials to be applied to the Twintex material are placed on another silicone sheet held in an aluminum frame that attaches to the frame holding the thermo-composite material. The Twintex material is then heated to forming temperature in a convection or infrared oven. The rubber and frame assembly with the cosmetic finish material is heated separately, using a shorter heating cycle and different pre-heating temperature. When both the Twintex and the cosmetic finish material are at the correct temperature, the two frames are joined at the side with a detachable hinge assembly and then pressed together by hand for one second between two hard, flat surfaces that fit into the bladder and frame assembly. The frame assembly with the hot Twintex and cosmetic finish material is then quickly positioned and locked down over the plaster tooling or mold. The mold is held in position on the base plate of the compression press with steel locator pins that are screwed into the mold material. The locator pins slide into holes drilled into the base plate of the compression press. The frame assembly is locked into position on the base plate of the compression press using a simple clip retainer mechanism. The pressure vessel section is then brought down over the mold and locked down onto the base plate of the pressure forming press. The vacuum is then released and 45 psi of air pressure is quickly applied to the bladder to pressure-form the hot thermo-composite material to the shape of the plaster mold. The pressure is maintained for the remainder of the cooling cycle. The total time between removing material from the oven or heat source and applying 45 psi in the compression press must be less than ten seconds.

After the material has cooled, the air pressure is released from the chamber, the pressure vessel is unlocked from the base plate of the assembly and the vessel is lifted off the mold with the assistance of a pulley system using counter weights. The thermo-composite material is allowed to cool for a few minutes before it is removed from the mold. The thermo-composite part is now ready for trimming. The total heating, pressure forming and cooling cycle time using this process is approximately 22 minutes. The time required to trim the part after pressure forming and cooling is approximately five minutes. To make a fiberglass part of a similar quality using a wet resin (thermo-set) such as an epoxy would take approximately three and a half hours. A thermo-set product that requires a gel coat finish will take two days to cure the resin. The system also prevents wrinkles from forming at the edge of the Twintex material during the molding process. These wrinkles are common in the plastic forming process involving vacuum referred to as blister molding. They are also common in thermo molding processes using pre-consolidated thermo-composite materials in a sheet form.

This bladder and frame system also provides the capability to pressure-mold thermoformable plastics in a sheet form that are not fiber reinforced. The advantage of this method over the conventional blister molding method is the ability to mold plastic parts with minimal amount of flash and subsequent material loss from stretching the plastic over a mold. As a result, a thicker, stronger part can be made using a smaller, thinner piece of sheet material, using a mold that can be fabricated quickly using inexpensive materials. The molding and cooling cycle times using this pressure forming method are also substantially less than conventional blister molding using vacuum. This technique provides a very cost effective alternative to injection molding for the prototyping and short production runs of thermoplastic parts.

3. The Twintex Lay-Up Method Using Stretch Lycra Cosmetic Finish Covers:

The parts made of Twintex that are fabricated using this method of pressure molding, such as knee braces, are finished with a stretch Lycra cosmetic finish. The laminations consist of (a) one to three layers of 44 oz. weight Twintex material, (b) one layer of stretch Lycra material, typically with a cosmetic color pattern printed into the material. The Lycras that are compatible with this manufacturing process are polyester and Lycra blends, typically with at least 80 percent polyester. Fabrics containing a high percentage of nylon fiber will also work with this method of manufacturing. (c) The Lycra is covered over the outside finish of the part using clear polypropylene sheeting with thicknesses varying between 4 mils and 16 mils. The Twintex material is heated on the bladder frame assembly described above for approximately 10 to 14 minutes at 400 degrees Fahrenheit. The stretch Lycra and clear polypropylene film are heated separately on the other half of the frame assembly at 400 degrees Fahrenheit for approximately two minutes. The two frames are then joined and the materials are pressed together by hand for one second between two flat surfaces. The frame assembly with the Twintex material and cosmetic finish materials is then quickly transferred to the compression press and locked down in position on the base plate. The compression chamber is brought down over the mold and the frame assembly and locked down onto the base plate. Then 45 psi of air pressure is applied to the hot materials over the mold as described above. After the part has cooled it is removed from the mold and trimmed in the method described above. This combination results in a very strong and very lightweight pressure formed fiberglass part with an excellent cosmetic finish. This method enables the ability to create different zones of flexibility and rigidity, or variable stiffness within the same thermo-composite part. This is done by varying the ply numbers and fiber directions within the part.

4. Embedded Fastener Positioning and Full Consolidation/Encapsulation in the Twintex Material:

This technique provides a method for the insertion of fastener attachment devices made of metal or other suitable materials that are accurately positioned and embedded in the post-formed Twintex material. This application lends itself to developing parts with superior structural integrity at the fastener/fiberglass part interface. This technique involves fabricating pieces made of metal, or other suitable materials, that can be drilled and tapped to receive bolts or screws with standard thread sizes. These metal pieces are cut and shaped to distribute the tensile, compressive and/or shear forces that are focused at the fastener/part interface over a wide area. The pieces are usually round in shape with beveled edges. The size of the piece will depend on the diameter of the bolt or screw that is used with the attachment piece and how much load is carried through the fastener. The attachment pieces are sandwiched between the separate layers of Twintex material before the material is heated and pressure-formed. Additional Twintex material can be easily added to the area of the fastener position before heating and forming to increase the structural integrity of the part in that area. The attachment pieces are positioned in the Twintex material before heating using a part location system in conjunction with specialized tooling that is positioned on the inside of the mold. This provides an accurate fastener placement within the post-formed Twintex part. After the attachment pieces have been positioned between the layers of Twintex material in their correct locations, the Twintex is heated and pressure-formed in the method described above. After the thermo-composite part has cooled and then removed from the mold, the attachment pieces can be drilled and tapped to receive bolts or screws.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A molding apparatus comprising:
    (a) an air pressure chamber with an open side;
    (b) a flange plate fitted to the open side of the air pressure chamber, said flange plate having an opening therein for receiving a mold;
    (c) a first bladder connected to the flange plate and covering the open side of the air pressure chamber;
    (d) a base pressure plate;
    (e) a mold positioned on the base pressure plate;
    (f) a locking mechanism for securing the air pressure chamber with the open side on the base pressure plate;
    (g) a second bladder positioned over the mold on the base pressure plate; and
    (h) an inlet/outlet port connected to the air pressure chamber for enabling air to be first evacuated from the air pressure chamber in order to pull the first upper bladder away from the mold, and then to be introduced into the air pressure chamber to force the first upper bladder against a thermoformable fibre reinforced composite material or other thermoplastic material positioned on the second lower bladder over the mold on the base pressure plate.

2. An apparatus as claimed in claim 1 including a retaining frame which holds the second lower bladder in place over the mold.

3. An apparatus as claimed in claim 1 wherein the air pressure chamber is pivotally connected with the base pressure plate.

4. An apparatus as claimed in claim 1 wherein the mold is formed of a single piece or of sections which are assembled together.

5. An apparatus as claimed in claim 1 including an outlet for evacuating air from between the second lower bladder and the base pressure plate.

6. An apparatus as claimed in claim 5 including flexible tubes for introducing air into or evacuating air from of the air pressure chamber and from the space between the first and second bladders.

7. An apparatus as claimed in claim 5 including a thermoformable plastic or drape molded fibre reinforced composite placed over the second bladder and vacuum fitted over the mold.

8. An apparatus as claimed in claim 7 including a heat source for heating the thermoformable plastic or drape molded fibre reinforced composite.

9. An apparatus as claimed in claim 1 wherein the mold is concave shaped for enabling concave shaped thermoformable fibre reinforced composites to be formed.

10. An apparatus as claimed in claim 1 wherein the mold is convex shaped for enabling convex shaped thermoformable fibre reinforced composites to be formed.

11. An apparatus as claimed in claim 1 including a first and a second thermoformable fibre reinforced composite and wherein a fastener retaining device is positioned between a first and a second thermoformable fibre reinforced composite and the first and second composite are heated and pressed together by the first bladder and the air pressure chamber over the mold.

* * * * *